(12) United States Patent
Joyner

(10) Patent No.: US 11,963,635 B2
(45) Date of Patent: Apr. 23, 2024

(54) CHAFING DISH SYSTEMS AND DEVICES

(71) Applicant: Table Dress Boutique, LLC, Bowie, MD (US)

(72) Inventor: Shaja B. Joyner, Bowie, MD (US)

(73) Assignee: Table Dress Boutique, LLC, Bowie, MD (US)

( * ) Notice: Subject to any disclaimer, the term of this patent is extended or adjusted under 35 U.S.C. 154(b) by 175 days.

(21) Appl. No.: 17/575,790

(22) Filed: Jan. 14, 2022

(65) Prior Publication Data

US 2022/0248900 A1    Aug. 11, 2022

Related U.S. Application Data

(63) Continuation-in-part of application No. 17/170,726, filed on Feb. 8, 2021, now Pat. No. 11,224,309.

(51) Int. Cl.

| | |
|---|---|
| *A47J 36/26* | (2006.01) |
| *A47J 36/02* | (2006.01) |
| *A47J 36/24* | (2006.01) |
| *A47J 36/34* | (2006.01) |
| *A47J 45/02* | (2006.01) |
| *B65D 6/02* | (2006.01) |
| *B65D 21/02* | (2006.01) |
| *B65D 25/28* | (2006.01) |
| *B65D 43/02* | (2006.01) |
| *A47J 36/06* | (2006.01) |
| *B65D 6/28* | (2006.01) |

(52) U.S. Cl.
CPC ....... *A47J 36/2405* (2013.01); *A47J 36/2477* (2013.01); *A47J 36/26* (2013.01); *A47J 36/06* (2013.01); *B65D 7/06* (2013.01); *B65D 7/34* (2013.01); *B65D 25/2894* (2013.01); *B65D 43/02* (2013.01)

(58) Field of Classification Search
CPC .... A47J 36/2405; A47J 36/2477; A47J 36/26; A47J 36/06; A47J 45/063; A47J 45/074; A47J 27/10; A47J 27/12; A47J 27/13; A47J 27/14; A47J 27/16; A47J 27/17; A47J 36/025; A47J 36/34; A47J 36/24; A47J 36/2438; A47J 45/07; A47J 2201/00; B65D 7/06; B65D 7/34; B65D 25/2894; B65D 43/02; B65D 43/022; B65D 2543/00851
USPC ....... 220/573.1, 573.4, 573.5, 574.2; 16/441, 16/422
See application file for complete search history.

(56) References Cited

U.S. PATENT DOCUMENTS

| | | |
|---|---|---|
| 77,884 A | 5/1868 | Isham |
| 296,043 A | 4/1884 | Neumuller et al. |
| D35,501 S | 12/1901 | Savage |

(Continued)

*Primary Examiner* — Gideon R Weinerth
(74) *Attorney, Agent, or Firm* — Gallium Law; Wesley Schwie; Isabel Fox

(57) ABSTRACT

A system of interchangeable chafing dish components may comprise a water pan comprising a holding portion configured to receive and hold at least one of liquid and ice, a food pan capable of being restably coupled to the water pan, the food pan comprising an interior portion configured to receive and hold at least one of a food and a liquid, a lid capable of being interchangeably coupled to at least one of the water pan and the food pan, and a plurality of knobs comprising a first knob and a second knob that is different from the first knob, wherein each of the first knob and the second knob is capable of being interchangeably coupled to the lid.

20 Claims, 36 Drawing Sheets

(56) References Cited

U.S. PATENT DOCUMENTS

| | | | |
|---|---|---|---|
| 690,519 A | 1/1902 | Gatrell | |
| 725,335 A | 4/1903 | Glaessner | |
| 810,730 A | 1/1906 | Drear | |
| 832,789 A | 10/1906 | Harding | |
| 857,428 A * | 6/1907 | Weston | F16B 5/02 411/338 |
| D38,924 S | 12/1907 | Wilkes | |
| D41,716 S | 8/1911 | Swan | |
| D45,601 S | 4/1914 | Mohrhenn | |
| 1,246,622 A | 11/1917 | Lightfoot | |
| 1,759,771 A | 5/1930 | Willi | |
| D88,156 S | 11/1932 | Knapp | |
| 2,100,567 A * | 11/1937 | Nelson | A47J 45/074 411/171 |
| D146,832 S | 5/1947 | O'Connell | |
| D150,157 S | 7/1948 | O'Connell | |
| D168,905 S | 2/1953 | O'Connell | |
| D169,166 S | 3/1953 | Village | |
| 2,697,642 A * | 12/1954 | Rudy | B25G 3/00 403/DIG. 1 |
| 2,731,663 A * | 1/1956 | Thompson | A47J 45/10 220/759 |
| D181,298 S | 10/1957 | Lax | |
| 3,144,016 A | 8/1964 | Basci | |
| 3,361,126 A | 1/1968 | Bloomfield | |
| D213,899 S | 4/1969 | Rickmeier | |
| 3,528,401 A | 9/1970 | Moore | |
| 3,606,609 A | 9/1971 | Lipper et al. | |
| D225,169 S | 11/1972 | McGowan | |
| D229,733 S | 1/1974 | Press | |
| 3,971,360 A | 7/1976 | Spoeth, Jr. | |
| 4,053,295 A * | 10/1977 | Miyauchi | C03B 27/04 29/447 |
| D278,403 S | 4/1985 | Cesaroni | |
| 4,838,446 A | 6/1989 | Ali | |
| 4,873,921 A | 10/1989 | Piane | |
| 4,885,819 A | 12/1989 | Delepine | |
| 4,920,873 A | 5/1990 | Stevens | |
| 4,996,410 A | 2/1991 | Ho | |
| D318,975 S | 8/1991 | Thurlow | |
| D318,976 S | 8/1991 | Thurlow | |
| 5,045,672 A | 9/1991 | Scott | |
| 5,119,800 A | 6/1992 | Roberts et al. | |
| 5,381,729 A | 1/1995 | Hennessy | |
| 5,467,697 A | 11/1995 | Hunziker | |
| D365,724 S | 1/1996 | Yu | |
| D369,507 S | 5/1996 | Tinius | |
| 5,517,903 A | 5/1996 | Kaufman | |
| 5,711,210 A | 1/1998 | Kaufman | |
| 5,788,196 A | 8/1998 | Forman | |
| 5,819,640 A | 10/1998 | Cuomo et al. | |
| D401,805 S | 12/1998 | Benz | |
| 5,881,637 A | 3/1999 | Strickel | |
| 5,974,953 A | 11/1999 | Messerli | |
| D423,278 S | 4/2000 | Briner | |
| D433,272 S | 11/2000 | Park | |
| D434,268 S | 11/2000 | Yu | |
| D434,594 S | 12/2000 | Yu | |
| D437,181 S | 2/2001 | Park | |
| 6,526,875 B1 | 3/2003 | Dzbinski | |
| 6,705,210 B2 | 3/2004 | Leonard | |
| D488,343 S | 4/2004 | Tse | |
| D488,668 S | 4/2004 | Tse | |
| D488,669 S | 4/2004 | Tse | |
| D488,950 S | 4/2004 | Tse | |
| D503,068 S | 3/2005 | May | |
| 6,872,920 B2 | 3/2005 | Haber | |
| D506,349 S | 6/2005 | Wasserman | |
| D532,647 S | 11/2006 | Wasserman | |
| D548,001 S | 8/2007 | Gross | |
| D625,548 S | 10/2010 | Lavy | |
| D644,868 S | 9/2011 | Saboe | |
| D645,296 S | 9/2011 | Saboe | |
| D645,297 S | 9/2011 | Saboe | |
| D645,298 S | 9/2011 | Saboe | |
| 8,123,067 B2 | 2/2012 | Thomson | |
| 9,187,224 B1 * | 11/2015 | Mazzilli | B65D 55/00 |
| D781,647 S | 3/2017 | Bogazzi | |
| D807,116 S | 1/2018 | Fariello | |
| D809,341 S | 2/2018 | Fariello | |
| D825,978 S | 8/2018 | Treyes | |
| D845,060 S | 4/2019 | Joyner | |
| 10,307,015 B1 | 6/2019 | Shane | |
| D855,400 S * | 8/2019 | Oley | D7/505 |
| D866,239 S | 11/2019 | Amirault | |
| D873,066 S | 1/2020 | Amirault | |
| 10,555,639 B2 | 2/2020 | Casternovia | |
| D891,170 S | 7/2020 | Joyner | |
| D891,850 S | 8/2020 | Joyner | |
| D891,851 S | 8/2020 | Joyner | |
| 10,898,027 B1 * | 1/2021 | Mishan | A47J 36/064 |
| 11,224,309 B1 * | 1/2022 | Joyner | B65D 7/34 |
| 2002/0125245 A1 | 9/2002 | Fuchs | |
| 2003/0098311 A1 * | 5/2003 | Parentini | A47G 19/2255 220/630 |
| 2003/0150860 A1 * | 8/2003 | Lee | B65D 43/0222 220/377 |
| 2003/0192525 A1 | 10/2003 | Ruiseco | |
| 2005/0076795 A1 | 4/2005 | Riddle | |
| 2005/0077303 A1 * | 4/2005 | Minner | A47G 19/2255 220/574 |
| 2005/0079339 A1 | 4/2005 | Riddle | |
| 2005/0100717 A1 | 5/2005 | Riddle | |
| 2005/0167381 A1 | 8/2005 | Fariello | |
| 2005/0283950 A1 * | 12/2005 | Portelli | A47B 95/02 16/441 |
| 2007/0017389 A1 | 1/2007 | Basch | |
| 2007/0257048 A1 * | 11/2007 | Towery | A47G 23/06 220/703 |
| 2009/0095169 A1 | 4/2009 | York | |
| 2010/0230420 A1 | 9/2010 | Panizzi et al. | |
| 2011/0303104 A1 | 12/2011 | Han | |
| 2012/0031910 A1 | 2/2012 | Hogestyn | |
| 2012/0217253 A1 * | 8/2012 | Plott | A47J 36/2405 220/574 |
| 2014/0319159 A1 | 10/2014 | Bochenek | |
| 2015/0040777 A1 | 2/2015 | Leonard | |
| 2015/0196157 A1 | 7/2015 | Swisth | |
| 2016/0157676 A1 | 6/2016 | Difante | |
| 2016/0249768 A1 | 9/2016 | Casey et al. | |
| 2017/0196402 A1 * | 7/2017 | Kearney | A47J 36/2477 |
| 2017/0196403 A1 | 7/2017 | Treyes | |
| 2018/0014690 A1 * | 1/2018 | Oh | A47J 36/06 |
| 2018/0168394 A1 * | 6/2018 | Casternovia | A47J 36/022 |
| 2018/0208365 A1 | 7/2018 | Girard | |
| 2018/0235400 A1 | 8/2018 | Jones | |
| 2020/0095018 A1 * | 3/2020 | Truong | A47J 45/063 |
| 2020/0390275 A1 | 12/2020 | Colace | |
| 2021/0137308 A1 | 5/2021 | Craig | |
| 2022/0039606 A1 * | 2/2022 | Skvorecz | A47J 36/2405 |
| 2022/0248900 A1 * | 8/2022 | Joyner | A47J 36/2477 |

\* cited by examiner

CHAFING DISH SYSTEMS AND DEVICES

CROSS-REFERENCE TO RELATED APPLICATIONS

The entire contents of the following application are incorporated by reference herein: U.S. patent application Ser. No. 17/170,726; filed Feb. 8, 2021; issued as U.S. Pat. No. 11,224,309 on Jan. 18, 2022; and entitled CHAFING DISH SYSTEMS AND DEVICES.

BACKGROUND

Field

Various embodiments disclosed herein relate to chafing dish sets. Certain embodiments relate to chafing dish sets including interchangeable dishes, lids, and knobs.

Description of Related Art

Serving ware, including chafing dishes, are often used to serve foods and liquids in large quantities. In addition, chafing dishes are often configured to keep foods and liquids at a desired temperature for sustained periods of time, such as for the duration of an event. Chafing dish sets often include a water pan, a food dish, a lid, and a stand configured to suspend the water pan and food dish over a heat source, such as chafing fuel. Chafing dish sets are commonly seen with large rectangular water pans, food dishes, and lids in aluminum or other metallic-silver-colored material.

Summary

The disclosure includes a chafing dish set comprising a stand, a water pan capable of being restably coupled to the stand, wherein the water pan comprises a holding portion configured to receive and hold a liquid, and a food pan capable of being restably coupled to the water pan, wherein the food pan comprises an interior portion configured to receive and hold at least one of a food and a liquid. In some embodiments, the chafing dish set further comprises a lid capable of being restably coupled to the food pan, wherein the lid is configured to substantially cover the interior portion of the food pan. The chafing dish set may further comprise a first knob capable of being interchangeably coupled to the lid. In some embodiments, the chafing dish set comprises a second knob capable of being interchangeably coupled to the lid, wherein the second knob is different from the first knob.

The chafing dish set may comprise a platter capable of being restably coupled to the food pan, wherein the platter may comprise an elevated food surface configured to sit within the interior portion of the food pan. In some embodiments, the platter is capable of restably coupling entirely within the interior portion of the food pan, and the food pan is capable of restably coupling entirely within the holding portion of the water pan. The food pan may define a first depth and the platter may define a second depth, wherein the first depth may be greater than the second depth. In some embodiments, the water pan defines a third depth, wherein the third depth is greater than the first depth and the second depth. The platter may define a hammered surface.

In some embodiments, the chafing dish set further comprises a chafing fuel cover capable of substantially surrounding a sidewall portion of a chafing fuel canister, the chafing fuel cover comprising an aperture substantially aligned with a flame emitting portion of the chafing fuel canister. The chafing dish set may further include a chafing fuel base capable of substantially surrounding a lower portion of the chafing fuel canister, wherein the chafing fuel cover and the chafing fuel base substantially surround the chafing fuel canister except for the flame emitting portion of the chafing fuel canister. In some embodiments, the chafing fuel cover and the chafing fuel base each define a hammered surface.

An exterior surface of the water pan may define a first exterior design and the holding portion of the water pan may define a first interior design. In some embodiments, an exterior surface of the food pan defines a second exterior design and the interior portion of the food pan defines a second interior design. An exterior surface of the lid may define a third exterior design and an interior portion of the lid may define a third interior design. Each of the first exterior design, the first interior design, the second exterior design, the second interior design, the third exterior design, and the third interior design may define at least one of at least one color and at least one pattern. In some embodiments, the first exterior design substantially matches the second exterior design and the third exterior design, and the first interior design substantially matches the second interior design and the third interior design. The first exterior design, second exterior design, and third exterior design may be different from the first interior design, second interior design, and third interior design. In some embodiments, the first exterior design, second exterior design, and third exterior design substantially match the first interior design, second interior design, and third interior design.

An exterior surface of the platter may define a fourth exterior design and an interior portion of the platter may define a fourth interior design. Each of the first exterior design, the first interior design, the second exterior design, the second interior design, the fourth exterior design, and the fourth interior design may define at least one of at least one color and at least one pattern. In some embodiments, the first exterior design substantially matches the second exterior design and the fourth exterior design, and the first interior design substantially matches the second interior design and the fourth interior design. The first exterior design, second exterior design, and fourth exterior design may be different from the first interior design, second interior design, and fourth interior design. In some embodiments, the first exterior design, second exterior design, and fourth exterior design substantially match the first interior design, second interior design, and fourth interior design.

In some embodiments, the water pan comprises a first water pan defining a first form factor, the food pan comprises a first food pan defining the first form factor, and the platter comprises a first platter defining the first form factor, the chafing dish set further comprising a second water pan capable of being restably coupled to the stand, the second water pan comprising a holding portion configured to receive and hold a liquid and defining a second form factor, a second food pan capable of being restably coupled to the second water pan, wherein the second food pan comprises an interior portion configured to receive and hold at least one of a food and a liquid and defines the second form factor, and a second platter capable of being restably coupled to the second food pan, the second platter defining the second form factor. The first form factor may define a first shape and the second form factor may define a second shape, wherein the first shape may be different from the second shape.

In some embodiments, at least one of the stand, the water pan, and the food pan comprises a stainless-steel coating. In some embodiments, at least one of the water pan and the food pan comprises an insulating liner.

The disclosure includes a system of interchangeable chafing dish components comprising a water pan comprising a holding portion configured to receive and hold at least one of liquid and ice, a food pan capable of being restably coupled to the water pan, the food pan comprising an interior portion configured to receive and hold at least one of a food and a liquid, a lid capable of being interchangeably coupled to at least one of the water pan and the food pan, and a plurality of knobs comprising a first knob and a second knob that is different from the first knob, wherein each of the first knob and the second knob is capable of being interchangeably coupled to the lid. In some embodiments, the system further comprises a platter capable of being restably coupled to at least one of the water pan, the food pan, and the lid. The platter may comprise an elevated food surface configured to sit within at least one of the holding portion of the water pan and the interior portion of the food pan. In some embodiments, the platter is capable of restably coupling entirely within the interior portion of the food pan, wherein the food pan is capable of restably coupling entirely within the holding portion of the water pan. The system may further comprise a stand, wherein at least one of the water pan, the food pan, and the platter may be configured to restably couple to the stand.

In some embodiments, the water pan comprises a first water pan, the food pan comprises a first food pan, the lid comprises a first lid, and the platter comprises a first platter. The system may further comprise a second water pan comprising the holding portion configured to receive and hold at least one of liquid and ice, and a second food pan capable of being restably coupled to the second water pan, the second food pan comprising the interior portion configured to receive and hold at least one of a food and a liquid. In some embodiments, the system includes a second platter capable of being restably coupled to at least one of the second water pan and the second food pan, the second platter comprising the elevated food surface configured to sit within at least one of the holding portion of the second water pan and the interior portion of the second food pan. The system may also include a second lid capable of being interchangeably coupled to at least one of the second water pan, the second food pan, and the second platter.

In some embodiments, the second food pan is capable of interchangeably coupling to at least one of the first water pan and the second water pan. The second platter may be capable of interchangeably coupling to at least one of the first water pan, the second water pan, the first food pan, and the second food pan. In some embodiments, the second lid is capable of interchangeably coupling to at least one of the first water pan, the second water pan, the first food pan, the second food pan, the first platter, and the second platter. The first knob may be capable of interchangeably coupling to at least one of the first lid and the second lid, and the second knob may be capable of interchangeably coupling to at least one of the first lid and the second lid.

The stand may comprise a first stand defining a first stand form factor, the first water pan may define a first water pan form factor, the first food pan may define a first food pan form factor, the first platter may define a first platter form factor, and the first lid may define a first lid form factor. In some embodiments, the system further comprises a second stand defining a second stand form factor. The second water pan may define a second water pan form factor, the second food pan may define a second food pan form factor, the second platter may define a second platter form factor, and the second lid may define a second lid form factor. In some embodiments, at least one of the second water pan, the second food pan, and the second platter is configured to restably couple to the second stand.

In some embodiments, the system further comprises a heating mechanism configured to warm at least one of the first water pan, the second water pan, the first food pan, the second food pan, the first platter, and the second platter. The heating mechanism may comprise a hot plate. In some embodiments, the heating mechanism comprises a chafing fuel canister. The system may further comprise a chafing fuel cover and a chafing fuel base configured to substantially surround a bottom portion and a sidewall of the chafing fuel canister.

The disclosure includes a system of interchangeable vessels comprising a plurality of first vessels and a plurality of second vessels, wherein each second vessel of the plurality of second vessels sized and configured to restably couple within each first vessel of the plurality of first vessels. The system may include a plurality of lids, each lid of the plurality of lids sized and configured to restably couple to at least one of each first vessel of the plurality of first vessels and each second vessel of the plurality of second vessels. In some embodiments, the system comprises a plurality of knobs comprising a first knob and a second knob that is different from the first knob, wherein each of the first knob and the second knob is capable of being interchangeably coupled to each lid of the plurality of lids.

In some embodiments, the system further comprises a plurality of third vessels, wherein each third vessel of the plurality of third vessels is sized and configured to restably couple within each second vessel of the plurality of second vessels, and wherein each lid of the plurality of lids is sized and configured to restably couple to each third vessel of the plurality of third vessels. Each first vessel of the plurality of third vessels may define a first depth, each second vessel of the plurality of second vessels may define a second depth, and each third vessel of the plurality of third vessels may define a third depth. In some embodiments, the first depth is greater than the second depth and the third depth, and the second depth is greater than the third depth.

The system of interchangeable vessels may further comprise a plurality of stands, wherein at least one of each first vessel of the plurality of first vessels, each second vessel of the plurality of second vessels, and each third vessel of the plurality of third vessels is configured to restably couple to each stand of the plurality of stands.

In some embodiments, the first knob is interchangeably coupled to each lid of the plurality of lids via a first attachment mechanism, and the second knob is interchangeably coupled to each lid of the plurality of lids via a second attachment mechanism. The first attachment mechanism may be different from the second attachment mechanism. In some embodiments, the first attachment mechanism comprises a bolt and nut mechanism. The second attachment mechanism may comprise at least one magnet.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
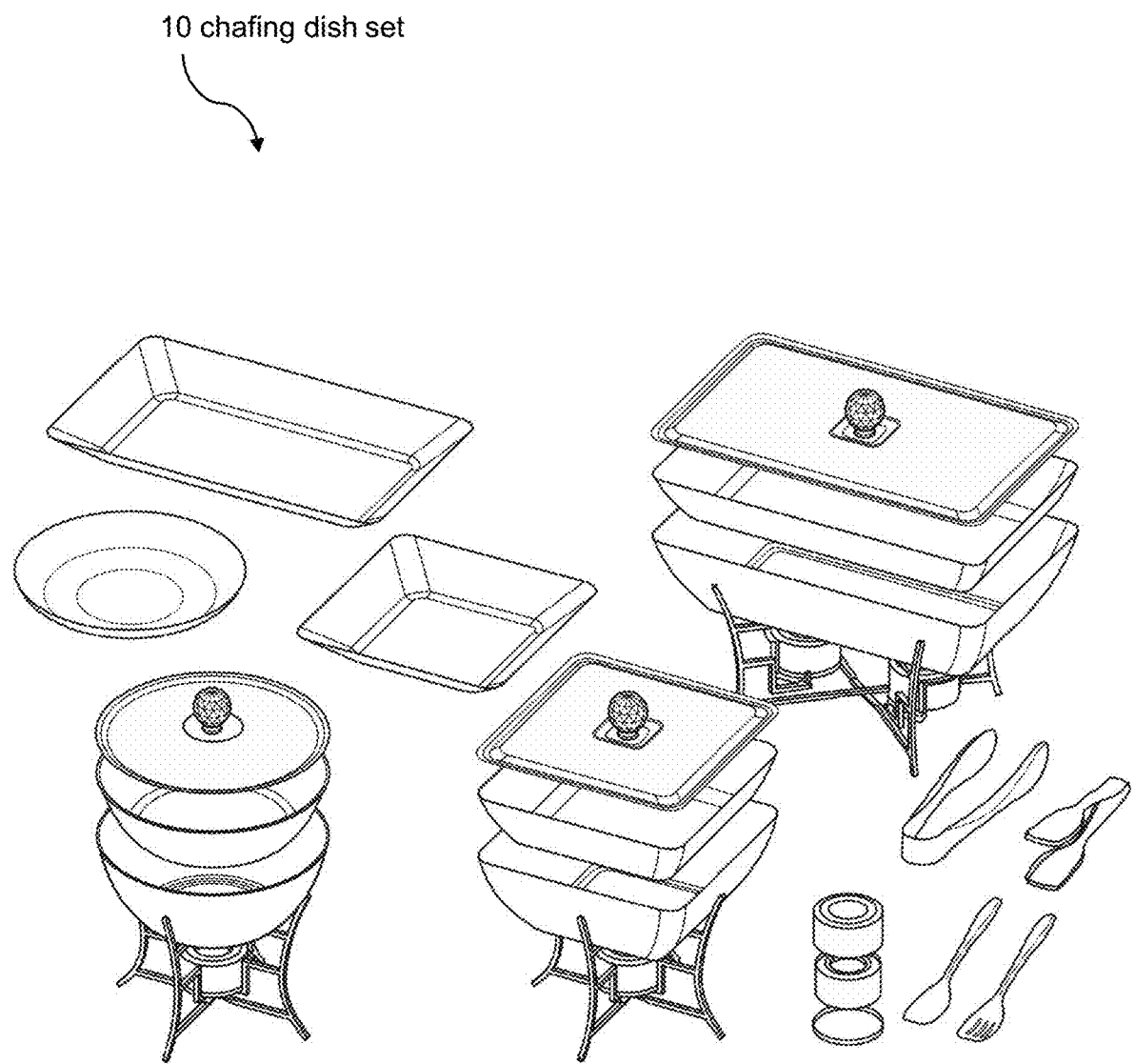
FIG. 1 illustrates a perspective view of a chafing dish set, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. All such aspects or advantages are not necessarily achieved by any particular embodiment. For example, various embodiments may be carried out in a manner that achieves or optimizes one advantage or group of advantages as taught herein without necessarily achieving other aspects or advantages as may also be taught or suggested herein.

INTRODUCTION

An objective of the present invention is to provide a chafing dish set that is capable of keeping food and/or liquid at a desired temperature for an extended period of serving, and is also an aesthetically pleasing food presentation option. Of the embodiments described herein are different colors, shapes, and combinations thereof for the water pans, food pans, platters, and/or lids associated with the chafing dish set. Embodiments may also include interchangeable knobs configured to be coupled to the lid. Embodiments may also include disposable chafing dish sets designed with a stainless-steel coating in order to elevate the overall appearance of a disposable chafing dish set. In addition, any of the water pan(s), food pan(s), platter(s), and/or lid(s) described herein may be capable of use in circumstances other than the presentation and/or storage of food and/or liquid. For example, any of the chafing dish set components may be used as/for interior design (e.g., home or business staging), home décor (e.g., candle display tray), indoor/outdoor use (e.g., as a small garden bed for flowers or vegetables), crafting/gifting (e.g., gift basket), decorative food storage/presentation, general decorative organization, serveware for formal and informal settings with two or three dish options, etc.

LIST OF REFERENCE NUMERALS

10— chafing dish set
12— stand
13a— stand in open configuration
13b— stand in closed configuration
14— water pan
16—holding portion (of water pan)
18— food pan
20— interior portion (of food pan)
22— lid
24— knob
26—platter
28— elevated food surface
30a— first depth (food pan)
30b— second depth (platter)
30c— third depth (water pan)
32— hammered surface 34— chafing fuel cover
36— sidewall portion (of chafing fuel canister)
38— chafing fuel canister
39— hot plate
40—aperture
42— flame emitting portion
44— chafing fuel base
46— lower portion (of chafing fuel canister)
64— form factor
66—lid form factor
67— knob form factor
68— insulating liner
70— conformable edge
72— exterior design
74— interior design
76—removable trim
78— system of interchangeable chafing dish components
80— water pan
82— holding portion
84— food pan
86—interior portion
90— lid
92— plurality of knobs
92a— first knob
92b— second knob
94—platter
96— elevated food surface
98— stand
100a— first stand form factor
100b— second stand form factor
102a— first water pan form factor
102b— second water pan form factor
104a— first food pan form factor
104b— second food pan form factor
106a— first platter form factor
106b— second platter form factor
108a— first lid form factor
108b— second lid form factor
110— plurality of first vessels
112— plurality of second vessels
114—plurality of third vessels
116— plurality of lids
118— plurality of knobs
118a— first knob
118b— second knob
120— system of interchangeable vessels
122—bolt and nut mechanism
124— at least one magnet FIG. 1 illustrates multiple components of a chafing dish set 10. Each of the components of the set 10 shown in FIG. 1 will be discussed in greater detail later in the disclosure, with reference to the other Figures.

Figure 2:
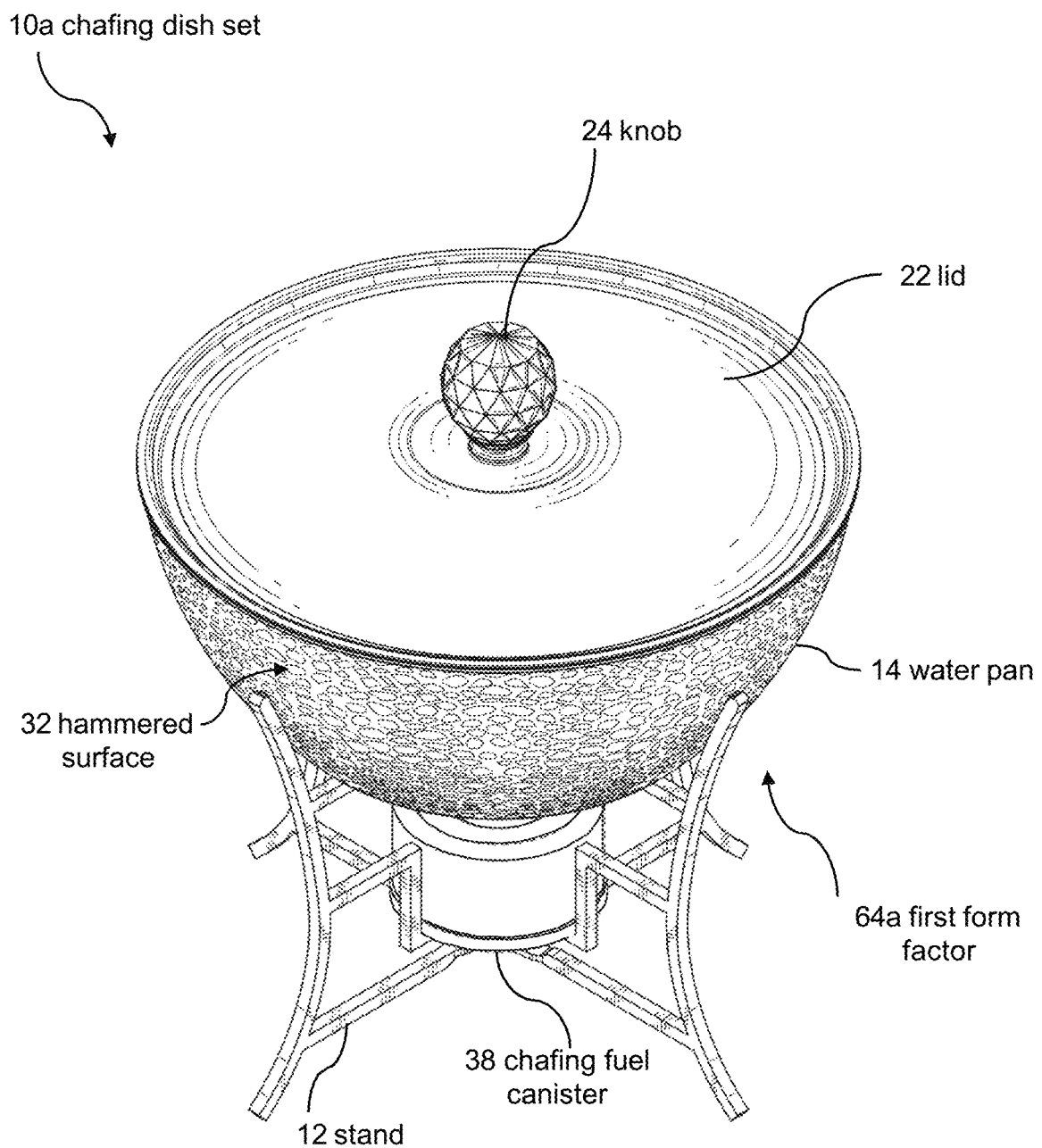
FIG. 2 illustrates a top perspective view of a chafing dish set, according to some embodiments.

FIG. 2 illustrates a perspective view of a chafing dish set 10a. As shown, the set 10a may include a water pan 14, a stand 12, a lid 22, and a knob 24. In some embodiments, the stand 12 is configured to support the water pan 14, lid 22, and knob 24. The stand 12 may also be configured to hold a chafing fuel canister 38, as demonstrated in FIG. 2. In many embodiments, the chafing fuel canister 38 is located beneath the water pan 14, such that the heat emitted by the chafing fuel canister 38 is directed upward to the water pan 14. The water pan 14 may contain water (or any other suitable liquid) to store the heat emitted from the chafing fuel canister 38 and transfer the heat to a food and/or liquid located in a food pan 18 (not shown). In many embodiments, the food pan 18 sits substantially within the water pan 14. The food pan 18 will be discussed in greater detail with reference to FIGS. 7 and 8.

FIG. 2 also shows the hammered surface 32 of the water pan 14. A "hammered surface" may be defined as a random arrangement of physical indentations along a surface. The indentations may define a few millimeters in depth. The indentations may also be more shallow or deeper than a few millimeters. FIG. 2 illustrates the knob 24 with a faceted design. Any number of designs are possible for the knob 24, including different overall shapes (square, round, etc.), sizes, colors and/or patterns, and surfaces (smooth, textured, and the like). FIGS. 21-39 illustrate additional designs for the knob 24. In some embodiments, the set 10a comprises a first knob and a second knob, wherein the first knob is different from the second knob. Each of the first knob and the second knob may be configured to be interchangeably coupled to the lid 22. As indicated in FIG. 2, the set 10a defines a chafing dish set first form factor 64a. In some embodiments, as demonstrated, the chafing dish set first form factor 64a defines a generally round shape for the lid 22, water pan 14, and other elements of the set 10a not shown in FIG. 2. Other form factors will be discussed with reference to FIGS. 13 and 14.

Figure 3:
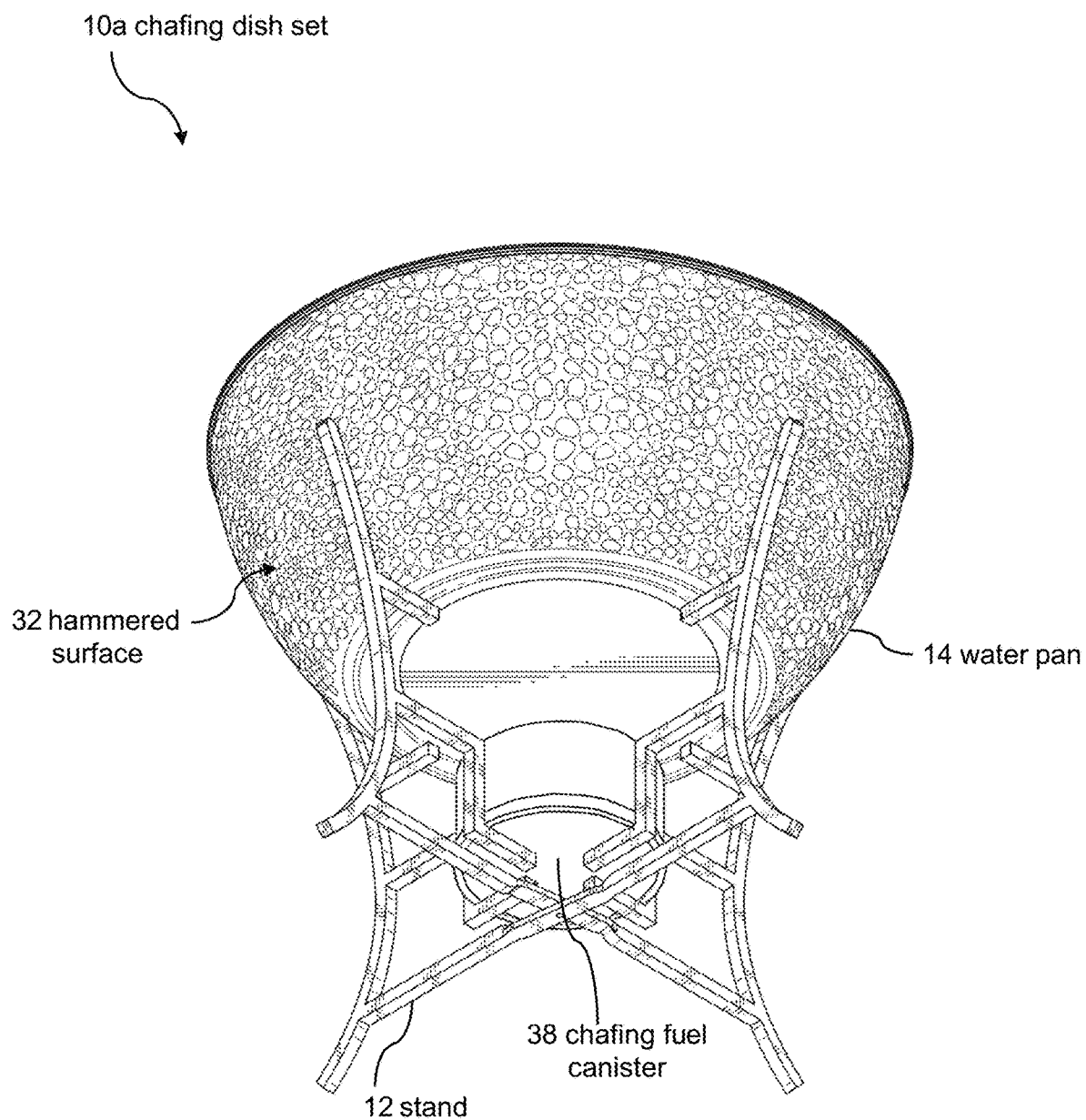
FIG. 3 illustrates a bottom perspective view of a chafing dish set, according to some embodiments.

FIG. 3 illustrates a bottom perspective view of the chafing dish set 10a. The chafing fuel canister 38 is shown resting in a center portion of the stand 12, below the water pan 14. FIG. 3 also demonstrates that, in some embodiments, the legs of the stand 12 extend greater than halfway up an exterior surface of the water pan 14. The legs of the stand 12 may extend less than halfway up an exterior surface of the water pan 14. In some embodiments, the stand 12 does not include legs that extend up the water pan 14, and the water pan 14 instead rests on a top portion of the stand 12. The legs of the stand 12 may be configured to provide support to the water pan 14, and prevent the water pan 14 from falling off the stand 12 in a scenario where the water pan 14 is bumped, jostled, pushed, or the like. FIG. 3 also illustrates that the hammered surface 32 may not extend to the bottom of the water pan 14. In some embodiments, the bottom of the water pan 14 comprises the hammered surface 32.

Figure 4:
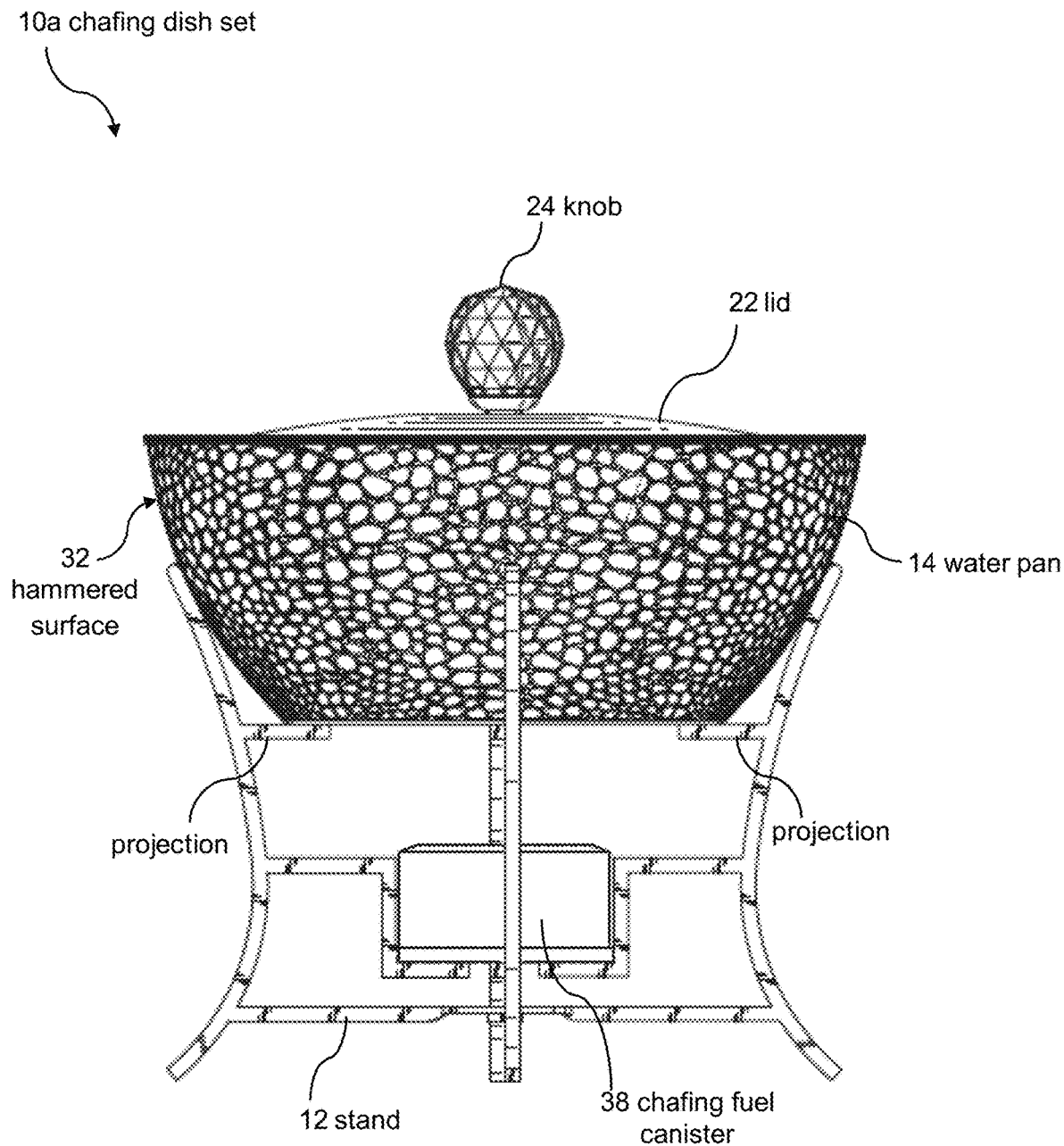
FIG. 4 illustrates a side view of a chafing dish set, according to some embodiments.

FIG. 4 illustrates a side view of the chafing dish set 10a. In some embodiments, the lid comprises a domed surface such that a center portion of the lid 22 extends further upward than an edge portion of the lid 22, as shown in FIG. 4. The lid 22 may comprise a flat surface. In some embodiments, the lid 22 comprises a concave surface such that the center portion is located lower (i.e., further into an interior portion of the water pan 14) than the outer edge portion of the lid 22.

FIG. 4 also shows that, in some embodiments, the stand 12 includes an upper portion configured to support the water pan 14 and a lower center portion configured to support the chafing fuel canister 38. The lower center portion may be located above the bottom of the stand 12, as illustrated in FIG. 4. The lower center portion may be located at the bottom portion of the stand 12. In some embodiments, the lower center portion is located near the upper portion, such that the space between the water pan 14 and the chafing fuel canister 38 is less than demonstrated in FIG. 4. The upper portion of the stand 12 may comprise short projections configured to support the water pan 14, as shown in FIG. 4. The projections may be longer than shown in the Figure. In some embodiments, the projections intersect or nearly intersect beneath the water pan 14, to form an "X" shape. The projections may be shorter than illustrated in FIG. 4.

Figure 5:
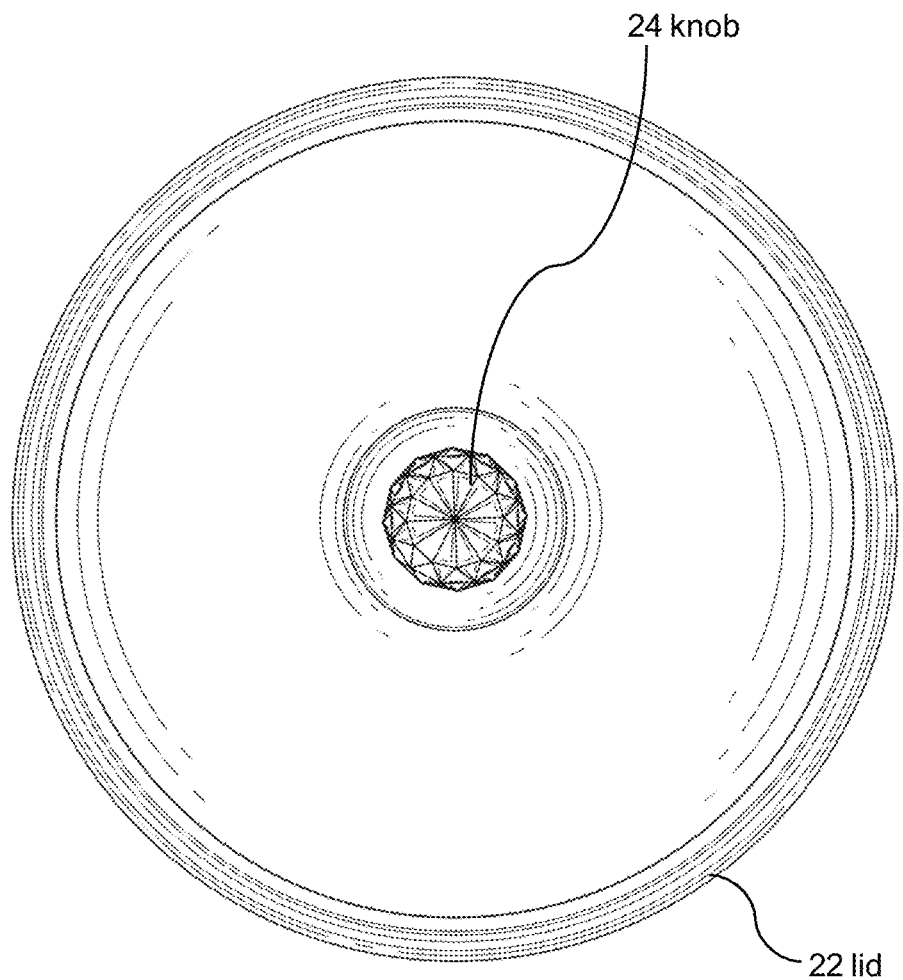
FIG. 5 illustrates a top view of a chafing dish set, according to some embodiments.

FIG. 5 illustrates a top view of the lid 22. As shown in FIG. 5, the knob 24 may be located substantially in the center of the lid 22. In some embodiments, the knob 24 is located closer to an edge than the center of the lid 22. As previously mentioned, the knob 24 may comprise any number of different sizes, shapes, textures, and design patterns (e.g., different colors, color combinations, or other design elements). In some embodiments, the knob 24 comprises an elongate handle configured to couple to the lid 22 at at least two points. The knob 24 may couple to the lid 22 at at least one point, and may be coupled via any suitable coupling mechanism such as, but not limited to, a screw, adhesive, a bolt, or any other suitable coupling mechanism.

Figure 6:
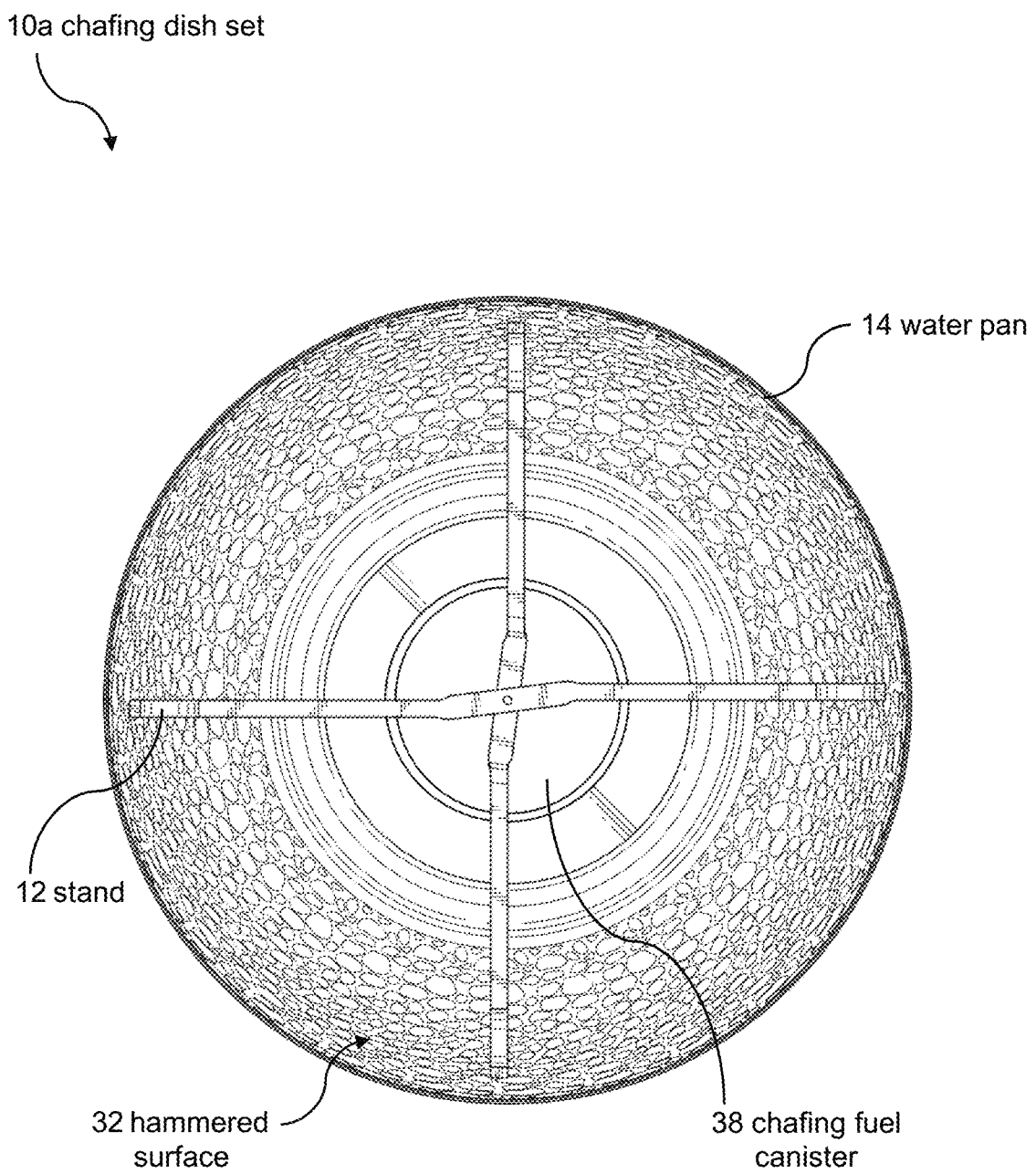
FIG. 6 illustrates a bottom view of a chafing dish set, according to some embodiments.
Figure 14:
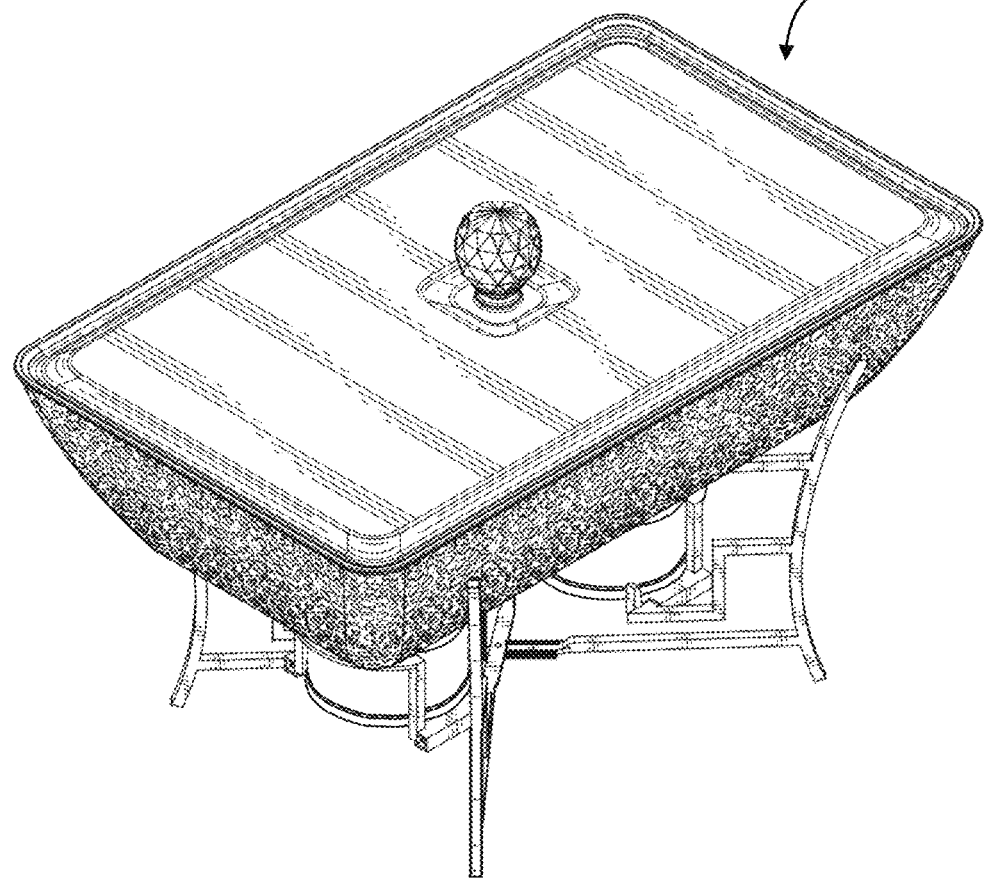

FIG. 6 illustrates a bottom view of the chafing dish set 10a. As previously discussed, the chafing fuel canister 38 may be located substantially in the center of the stand 12, such that the heat emitted from the chafing fuel canister 38 is directed toward substantially the center of the bottom of the water pan 14. In some embodiments, the chafing fuel canister 38 is located off-center with respect to the water pan 14. Locating the chafing fuel canister 38 off-center may be desirable to accommodate the use of multiple chafing fuel canisters 38, as shown in FIG. 14. FIG. 6 also shows that, in some embodiments, the legs of the stand 12 are substantially evenly located around a perimeter of the water pan 14. The legs of the stand 12 may be unevenly spaced around a perimeter of the water pan 14.

Figure 7:
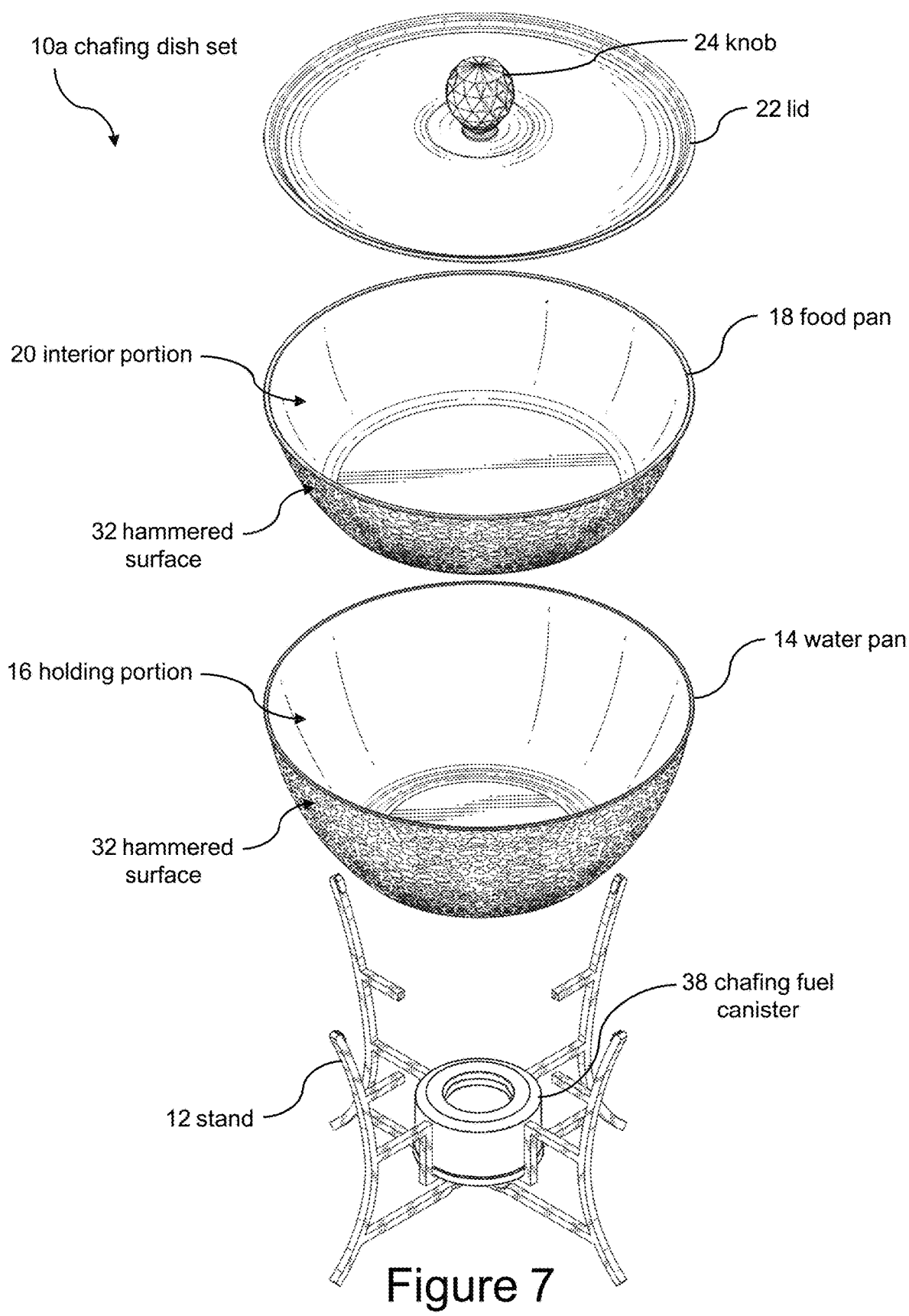
FIGS. 7 and 8 illustrate exploded views of various components of a chafing dish set, according to some embodiments.

FIG. 7 illustrates an exploded view of the chafing dish set 10a. In some embodiments, the set 10a includes a stand 12, a water pan 14, a food pan 18, and a lid 22. As mentioned with reference to the previous Figures, the stand 12 may be configured to hold a chafing fuel canister 38 and support the water pan 14. The food pan 18 may be configured to sit within a holding portion 16 of the water pan 14, such that the food pan 18 is substantially entirely nested within the holding portion 16. The lid 22 may be configured to be restably coupled to the food pan 18 such that the lid substantially covers the interior portion 20 of the food pan 18. When the food pan 18 is substantially entirely nested within the water pan 14, an upper edge of the water pan 14 may extend above an upper edge of the food pan 18, such that when viewed from the side, the food pan 18 is not visible within the water pan 14. In some embodiments, when the food pan 18 is substantially entirely nested within the water pan 14, the lid 22 is restably coupled to the water pan 14 rather than to the food pan 18. The upper edge of the food pan 18 may sit substantially flush with the upper edge of the water pan 14 such that the lid 22 restably couples to either or both the food pan 18 and the water pan 14.

In many embodiments, the water pan 14 comprises a holding portion 16 configured to hold a liquid, such as water, which receives and transfers the heat from the chafing fuel canister 38. The food pan 18 may rest above the water or other liquid in the holding portion 16. In some embodiments, the food pan 18 is at least partially submerged in the water or other liquid in the water pan 14. Resting above and/or being submerged in the water or other liquid may facilitate heating and/or maintaining a temperature of food and/or liquid held in the interior portion 20 of the food pan 18.

In some embodiments, the water pan 14 contains ice in the holding portion 16, and the ice is configured to keep the food and/or liquid in the food pan 18 cold. The ice may be configured to lower a temperature of the food and/or liquid in the food pan 18. The food pan 18 may be configured to sit above the ice. In some embodiments, the food pan 18 sits on top of and/or is at least partially submerged in the ice in the water pan 14. It should be noted that "ice" may include ice cubes, ice chips, shaved ice, "dry ice" (solidified carbon dioxide), an ice/water combination, a dry ice/water combination, cold water, reusable ice cubes, and/or other cold substances. In an embodiment where the water pan 14 contains ice in the holding portion 16, the set 10a does not include the chafing fuel canister 38. The set 10a may include the chafing fuel canister 38 in a non-ignited state. In some embodiments, when the water pan 14 contains ice, the set 10a does not include the stand 12, such that at least one of the water pan 14, food pan 18, and platter 26 is restably coupled to a table, counter, or similar surface.

The set 10a may also not include the chafing fuel canister 38 when the water pan 14 is empty, such that there is no temperature control for the food and/or liquid in the food pan 18. Temperature control may not be needed when the set 10a is being used for a smaller and/or more casual setting than an event, for example, a typical family dinner without an extended food serving time. In addition, at least one of the water pan 14 and the food pan 18 may be used as serveware without the need for the chafing fuel canister 38. When used as serveware, the water pan 14 and/or the food pan 18 may be configured to restably couple to the stand 12. In some embodiments, the stand 12 is not used and the water pan 14 and/or food pan 18 is configured to restably couple to a counter and/or tabletop surface.

Figure 8:
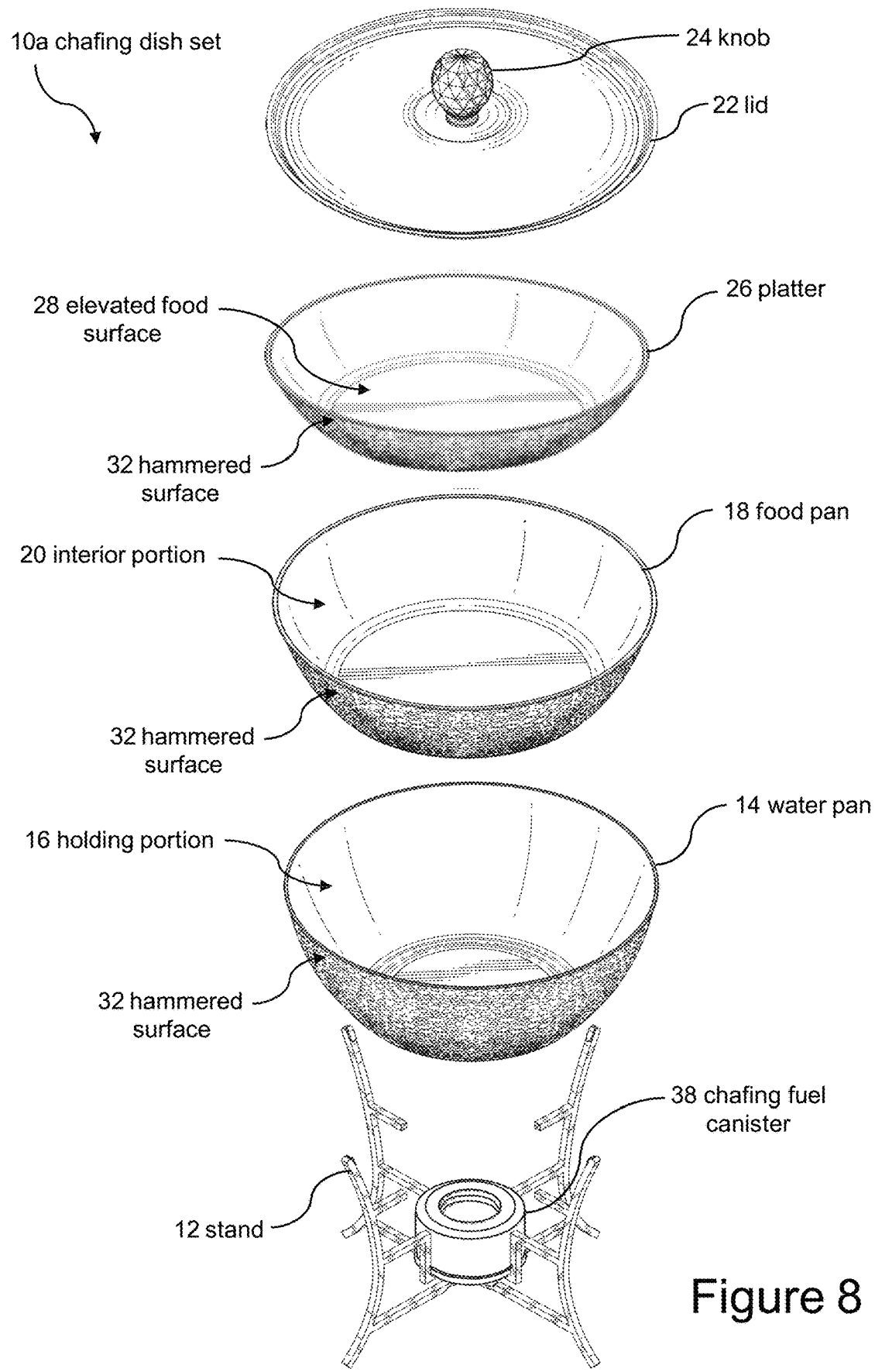

FIG. 8 illustrates another embodiment of the chafing dish set 10a. FIG. 8 is similar to FIG. 7 and illustrates that, in some embodiments, the set 10a includes a platter 26 in addition to the stand 12, water pan 14, food pan 18, and lid 22. The platter 26 may be configured to restably couple to the food pan 18 in a manner similar to how the food pan 18 restably couples to the water pan 14. In some embodiments, the platter 26 comprises an elevated food surface 28 configured to sit within the interior portion 20 of the food pan 18. The elevated food surface 28 may be configured to sit higher than a food surface of the interior portion 20 of the food pan 18. The platter 26 may be configured to couple to the food pan 18 when the food pan 18 contains food and/or liquid in the interior portion 20. In many embodiments, the platter 26 couples to the food pan 18 when the food pan 18 is substantially empty. The platter 26 may be configured to restably couple to the water pan 14. The platter 26 may be configured to restably couple to the stand 12. In some embodiments, similar to the serveware use of the water pan 14 and food pan 18 described above, the platter 26 is configured to sit on a table, counter, or similar surface nearby the rest of the set 10a without being coupled to at least one of the food pan 18 and water pan 14. This may enable the platter 26 to be used as additional serveware simultaneously with the food pan 18.

Similar to how the food pan 18 may be substantially entirely nested in the water pan 14, the platter 26 may be configured to substantially entirely nestle in the food pan 18. When the platter 26 is substantially entirely nested within the food pan 18, an upper edge of the food pan 18 may extend above an upper edge of the platter 26, such that when viewed from the side, the platter 26 is not visible within the food pan 18. The platter 26 may be coupled to the food pan 18 while the food pan 18 is coupled to the water pan 14 such that when viewed from the side, both the platter 26 and the food pan 18 are not visible within the water pan 14. In some embodiments, when the platter 26 is substantially entirely nested within the food pan 18, the lid 22 is restably coupled to the food pan 18 rather than to the platter 26. The upper edge of the platter 26 may sit substantially flush with the upper edge of the food pan 18 such that the lid 22 restably couples to either or both the platter 26 and the food pan 18.

In some embodiments, the platter 26 does not substantially entirely nestle in the food pan 18, and the upper edge of the platter 26 extends above the upper edge of the food pan 18. The lid 22 may be configured to be restably coupled to the platter 26.

Figure 9A:
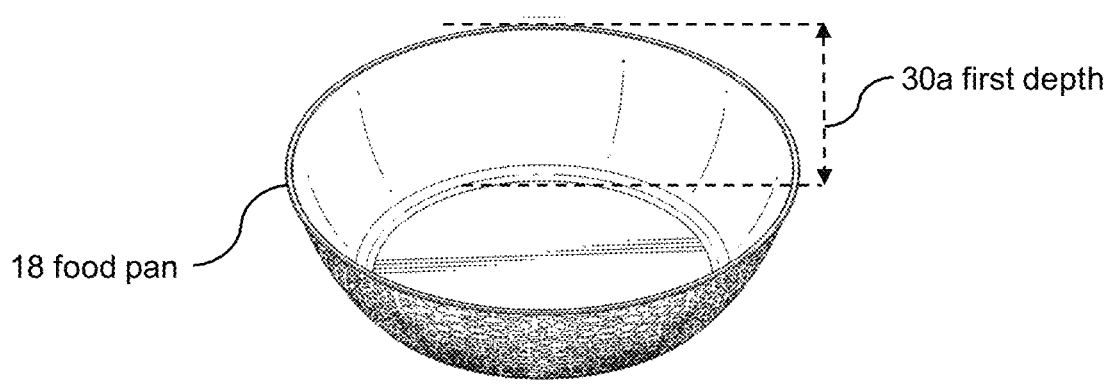
FIGS. 9A, 9B, 9C, 9D, 9E, and 9F illustrate the depths of different components of a chafing dish set, according to some embodiments.
Figure 9B:
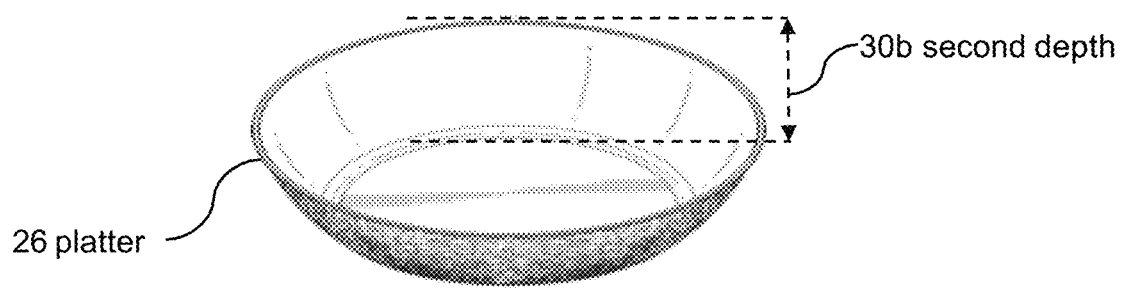
Figure 9C:
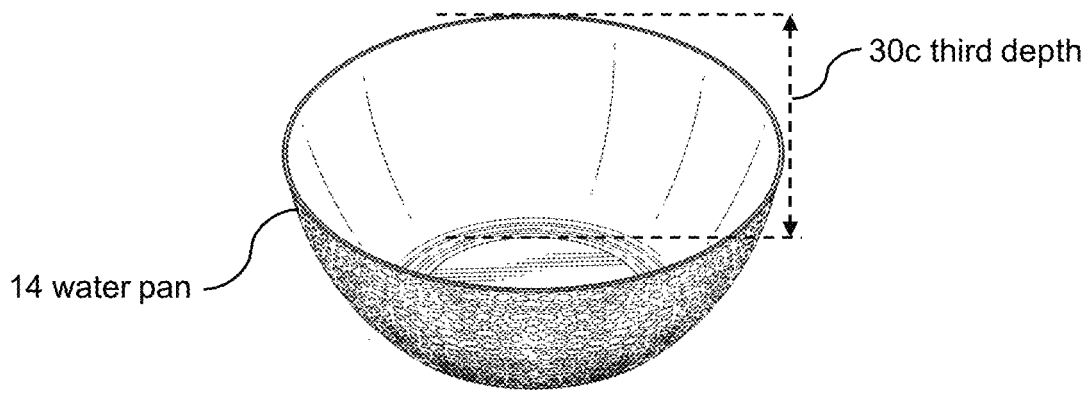
Figure 9D:
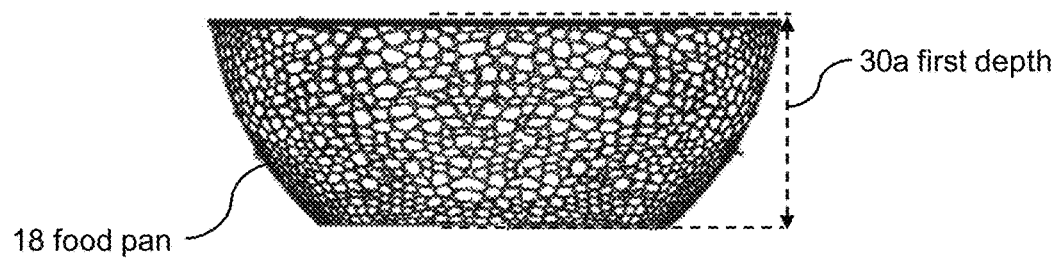
Figure 9E:
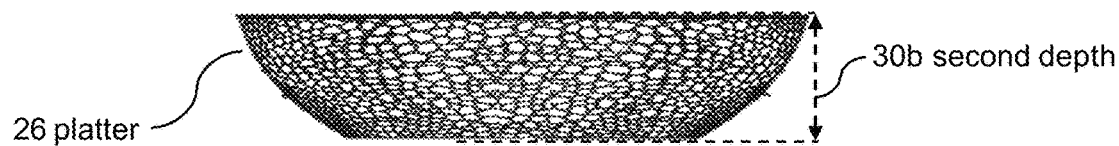
Figure 9F:
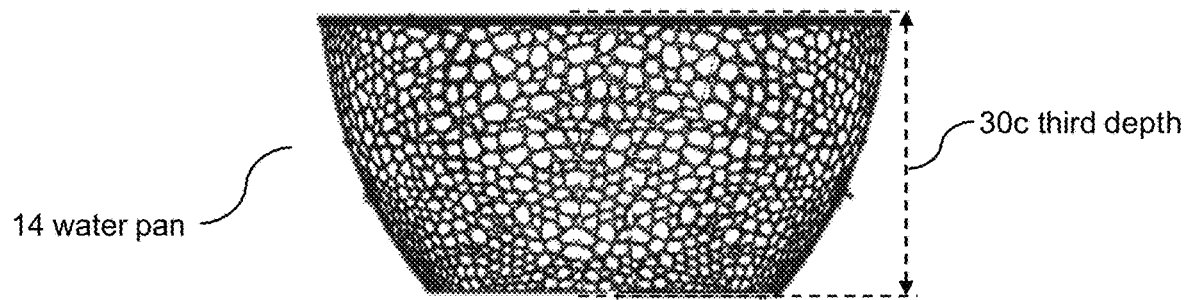

FIGS. 9A-9F show the relative depths of the platter 26, food pan 18, and water pan 14. In many embodiments, the food pan 18 defines a first depth 30a (as shown in FIGS. 9A and 9D), the platter 26 defines a second depth 30b (as shown in FIGS. 9B and 9E), and the water pan 14 defines a third depth 30c (as shown in FIGS. 9C and 9F). The third depth 30c may be greater than the first depth 30a and the second depth 30b. The first depth 30a may be greater than the second depth 30b. As such, in many embodiments, the water pan 14 is the deepest, the food pan 18 is the next deepest, and the platter 26 is the shallowest of the pans. It should be noted that the "depth" of each component is measured from a bottom portion to a top edge, as indicated with the side views shown in FIGS. 9D-9F.

The first depth 30a may be about 3.25 inches, the second depth 30b may be about 1.75 inches, and the third depth 30c may be about 4.75 inches. Any of the first depth 30a, second depth 30b, and third depth 30c may be greater or less than the listed dimensions. In some embodiments, other dimensions (width, circumference, etc.) are substantially the same for the water pan 14, food pan 18, and platter 26. The water pan 14, food pan 18, and platter 26 may vary in other dimensions when compared to one another. In some embodiments, at least one of the water pan 14, food pan 18, and platter 26 comprise a tapered outer surface such that a bottom circumference is less than a circumference of an upper edge of the water pan 14, food pan 18, and/or platter 26. In some embodiments, at least one of the water pan 14, food pan 18, and platter 26 does not comprise a tapered outer surface.

The different depths 30a, 30b, 30c may impact the amount of a substance that can fit in each of the water pan 14, food pan 18, and platter 26. For example, the food pan 18 may be configured to hold more of a food and/or liquid than the platter 26. As such, in an example where the chafing dish set 10a is used to serve food for an event, the platter 26 may be configured to hold an appetizer or dessert while the food pan 18 is configured to hold an entrée, as the entrée generally comprises a larger serving size than an appetizer or dessert. In an embodiment where the platter 26 is not coupled to the food pan 18 and instead sits adjacent the set 10a, the platter 26 may be used to hold a side dish, napkins, cutlery, or any other meal accessory. In some embodiments, the water pan 14 is the deepest to accommodate an amount of water, ice, or other substance while preserving room for the food pan 18 within the holding portion 16 of the water pan 14.

Figure 10A:
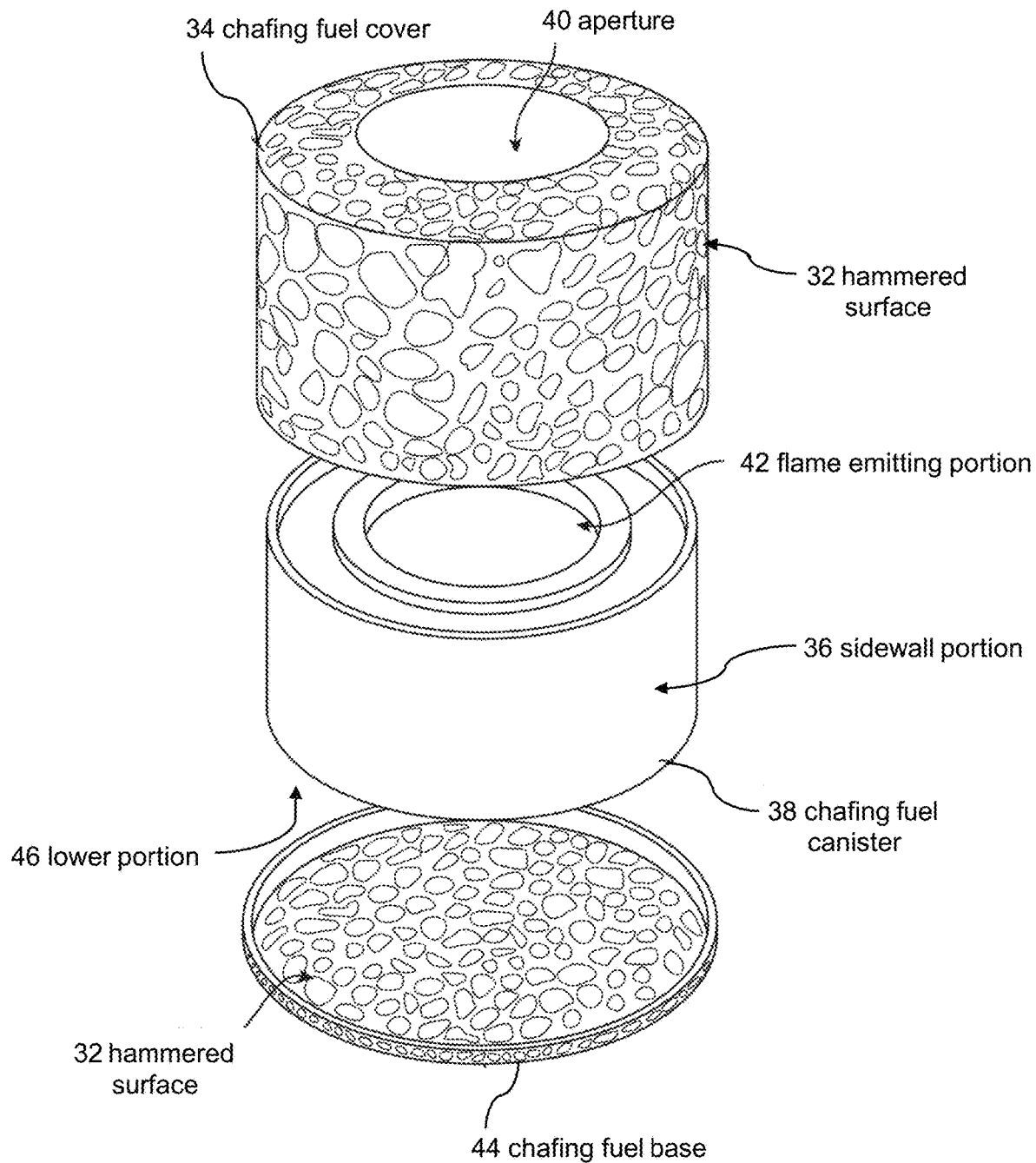
FIG. 10A illustrates an exploded view of a chafing fuel cover, chafing fuel base, and chafing fuel canister, according to some embodiments.

FIG. 10A illustrates an exploded view of a chafing fuel cover 34, a chafing fuel base 44, and a chafing fuel canister 38. In many embodiments, the chafing fuel cover 34 is configured to substantially surround a sidewall portion 36 of the chafing fuel canister 38. The chafing fuel cover 34 may contain an aperture 40 substantially aligned with a flame emitting portion 42 of the chafing fuel canister 38, such that the aperture 40 allows for the release of flames from the flame emitting portion 42. In some embodiments, the chafing fuel base 44 is configured to substantially surround a lower portion 46 of the chafing fuel canister 38. Accordingly, the chafing fuel cover 34 and chafing fuel base 44 may substantially surround an entirety of the chafing fuel canister 38, with the exception of the flame emitting portion 42. In some embodiments, the chafing fuel cover 34 comprises a movable cover configured to cover the aperture 40, and thereby cover the flame emitting portion 42. The movable cover may facilitate control and/or extinguishing of the flame from the chafing fuel canister 38. It should be noted that though the previous Figures were not labeled with the chafing fuel cover 34 and/or chafing fuel base 44, each of the embodiments illustrated by the Figures may include the chafing fuel cover 34 and/or the chafing fuel base 44 along with the chafing fuel canister 38.

Figure 10B:
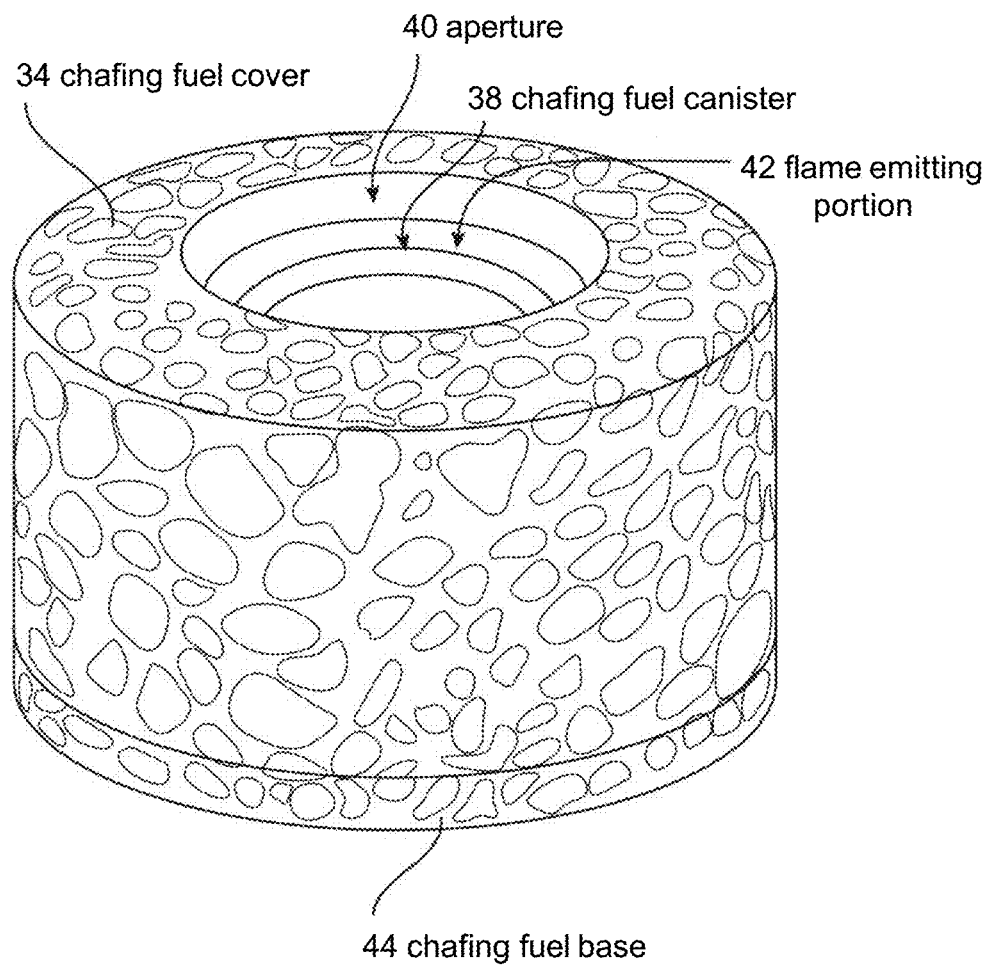
FIG. 10B illustrates a perspective view of a chafing fuel cover and a chafing fuel base, according to some embodiments.

FIG. 10B shows the assembled chafing fuel cover 34 and chafing fuel base 44 containing the chafing fuel canister 38. The chafing fuel cover 34 may couple to the chafing fuel base 44 in a variety of ways, including those not mentioned in this disclosure. For example, at least one of the chafing fuel cover 34 and the chafing fuel base 44 may comprise a threaded portion designed to rotationally couple (i.e., screw together) the cover 34 and base 44. The chafing fuel cover 34 may also restably couple to the chafing fuel base 44. In some embodiments, the chafing fuel base 44 defines a slightly larger diameter than the diameter of the chafing fuel cover 34, such that the chafing fuel cover 34 is configured to fit within the chafing fuel base 44. The chafing fuel cover 34 may also be configured to couple with the chafing fuel base 44 via a friction fit. In many embodiments, the chafing fuel cover 34 is configured to detachably couple to the chafing fuel base 44.

In some embodiments, the aperture 40 is sized substantially equal to a standard flame emitting portion 42 of a chafing fuel canister 38. A flame emitting portion 42 may measure about 1.75 inches (about 4.4 centimeters) in diameter. The aperture 40 may be sized larger than a standard flame emitting portion 42, or smaller than a standard flame emitting portion 42. Some examples of chafing fuel canisters 38 include: 10110 models produced by Sterno® Group, 4248 "True Heat" models produced by 7Penn®, 2306 models produced by Lot45®, F800 models produced by Fancy-Heat® Corp., and others models produced by these and other manufacturers. Chafing fuel canister 38 may have a wick. In some embodiments, chafing fuel canister 38 is wickless. Chafing fuel canister 38 may have a burn time of at least two hours. Chafing fuel canister may have a burn time of less than two hours. In many embodiments, the fuel of the chafing fuel canister 38 is at least one of methanol, ethanol, and diethylene glycol. The fuel may be in liquid, gel, or any other suitable form.

Though depicted in the figures as a cylindrical canister, chafing fuel canister 38 may comprise any other shape. Similarly, the chafing fuel cover 34 and/or chafing fuel base 44 may comprise any other suitable shape to fit a variety of chafing fuel canisters 38. The chafing fuel canister 38, chafing fuel cover 34, and chafing fuel base 44 may define a wide range of dimensions. For example, the chafing fuel canister 38 may define a diameter of about 3 inches and a height of about 2 inches. The chafing fuel cover 34 may define a diameter of about 3.25 inches and may define a height, when coupled to the chafing fuel base 44, of about 2.25 inches. The chafing fuel canister 38, chafing fuel cover 34, and chafing fuel base 44 may define dimensions greater or smaller than those listed here.

Figure 11:
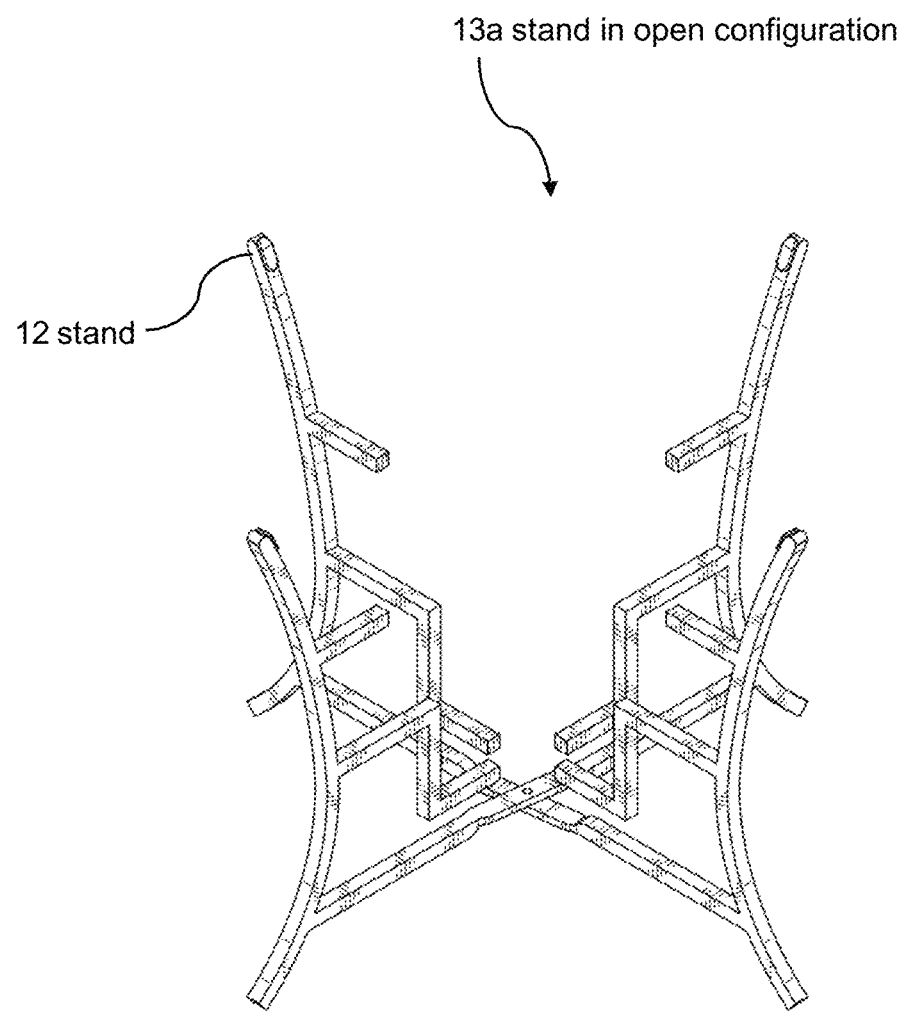
FIGS. 11 and 12 illustrate perspective views of a stand, according to some embodiments.
Figure 12:
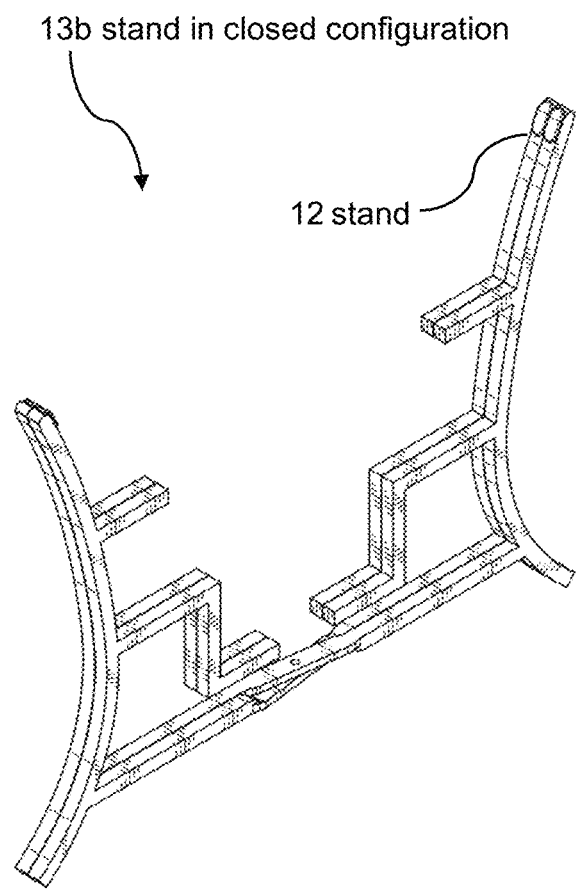

FIG. 11 illustrates a perspective view of the stand 12 in an open configuration 13a. FIG. 12 illustrates the stand 12 in a closed configuration 13b. The stand 12 may define a number of different shapes and may include different or additional components not illustrated in the Figures. For example, in some embodiments, the stand 12 comprises three legs rather than the four legs shown in the Figures. The legs of the stand 12 may be wider or narrower than depicted in the Figures. FIGS. 11 and 12 demonstrate that, in some embodiments, the legs of the stand 12 are bowed inward, toward the center of the stand 12. The legs may curve outwards away from the center of the stand 12. In some embodiments, the legs extend directly up and down, with no curvature. As illustrated in FIGS. 1-4, 7, and 8, the stand 12 may comprise a platform-type portion configured to support a chafing fuel canister 38. The Figures show the platform-type portion comprised of projections from each leg that extend toward the center of the stand 12, and down toward a base of the stand 12, before extending inward again, thus forming the platform/holder for the chafing fuel canister 38. In some embodiments, the platform-type portion extends directly inward from the legs of the stand 12. As such, the platform-type portion may be a simpler design than depicted in the Figures.

The stand 12 may comprise at least one plate located on at least one of a top portion and a bottom portion of the stand 12, such that the water pan 14 is restably coupled to a plate of the stand 12, rather than the projections extending from the legs of the stand 12, and the stand 12 contacts a table-top surface via a plate, rather than the legs of the stand 12. FIG. 12 demonstrates that the stand 12 may be configured to fold into a substantially flat configuration. The ability to fold may be achieved by rotationally coupling the legs of the stand 12. The stand 12 may comprise two components configured to detachably couple to form the open, "X"-shaped configuration shown in FIG. 11. In some embodiments, the stand 12 is fixed in the open configuration, and is not configured to fold, collapse, separate, or otherwise change configuration.

Figure 13:
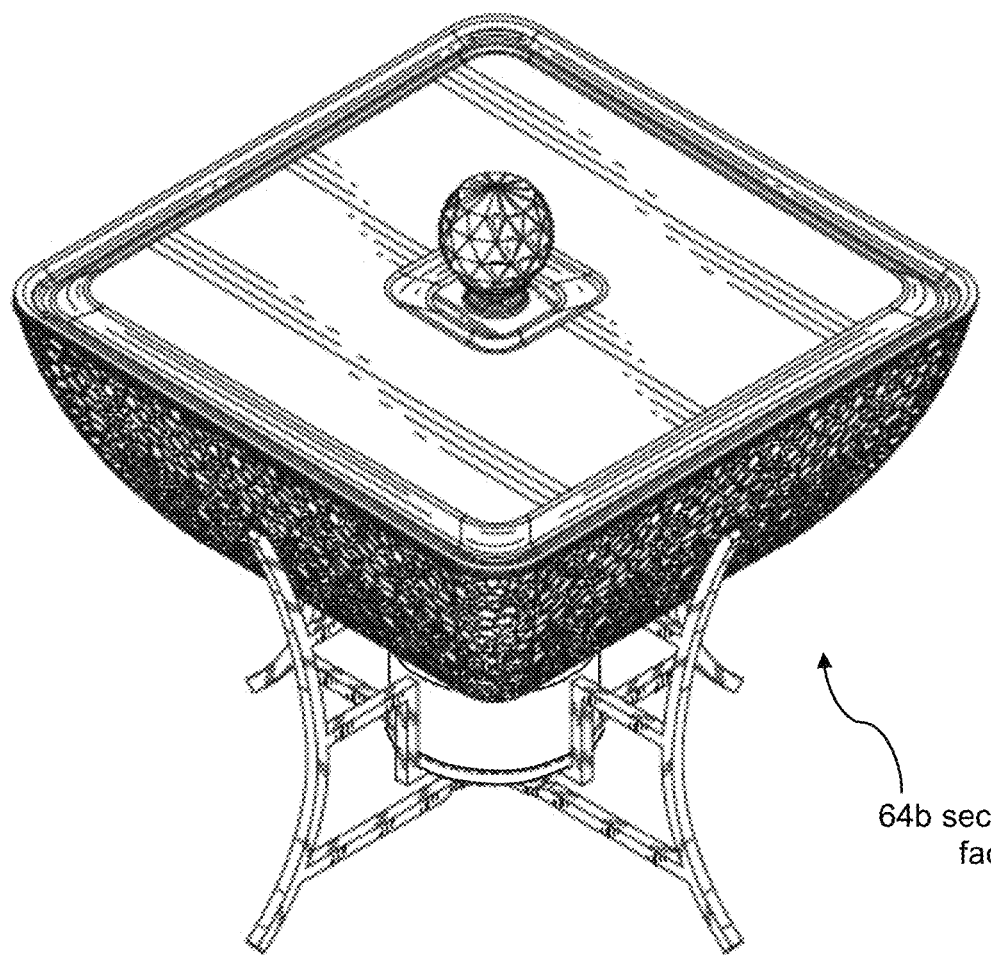
FIGS. 13 and 14 illustrate perspective views of a chafing dish set, according to some embodiments.

FIG. 13 illustrates an embodiment of a chafing dish set 10b. As shown, the set 10b comprises a chafing dish set second form factor 64b. In some embodiments, the chafing dish set second form factor 64b defines a substantially square shape. FIG. 14 shows another set, the chafing dish set 10c, comprising a chafing dish set third form factor 64c. The chafing dish set third form factor 64c may define a rectangular shape, as demonstrated in FIG. 14. It should be noted that a single form factor may define different sizes. In some embodiments, different sizes of form factors may be configured to couple to different sizes of the stand 12. For example, as illustrated in FIG. 14, the chafing dish set 10c includes a stand 12 sized and configured to accommodate two chafing fuel canisters 38, whereas the chafing dish sets 10a and 10b include a stand 12 sized and configured to accommodate a single chafing fuel canister 38. In some embodiments, the stand 12 is sized and configured to accommodate three or more chafing fuel canisters 38.

It should be noted that though generally round and generally rectangular shapes are used respectively throughout this disclosure to define the first form factor 64a, the second form factor 64b, and the third form factor 64c, other shapes may define other form factors. For example, an embodiment of a chafing dish set 10 may comprise a fourth form factor defining a generally ovoid shape. Other possible shapes include novelty shapes such as, but not limited to, star shapes, heart shapes, flower shapes, tree shapes (e.g., Christmas tree), shamrock shapes, triangle shapes, crescent shapes, and the like.

In some embodiments, an exterior surface of the water pan 14 defines a first exterior design, the holding portion 16 of the water pan 14 defines a first interior design, an exterior surface of the food pan 18 defines a second exterior design, the interior portion 20 of the food pan 18 defines a second interior design, an exterior surface of the lid 22 defines a third exterior design, an interior portion of the lid 22 defines a third interior design, an exterior surface of the platter 26 defines a fourth exterior design, and an interior portion of the platter 26 defines a fourth interior design. The interior portion of the platter 26 may comprise the elevated food surface 28. The first exterior design may substantially match the second, third, and fourth exterior designs, and the first interior design may substantially match the second, third, and fourth interior designs. In some embodiments, the first, second, third, and fourth exterior designs are different from the first, second, third, and fourth interior designs. The first, second, third, and fourth exterior designs may substantially match the first, second, third, and fourth interior designs.

In some embodiments, the first, second, third, and fourth exterior designs comprise at least one color, and the first, second, third, and fourth interior designs comprise at least one color. The designs of the exterior and/or interior surfaces/portions of at least one of the water pan 14, food pan 18, platter 26, and lid 22 may comprise a pattern (e.g., a plaid pattern, a striped pattern, a polka dot pattern, a floral pattern, and the like). The pattern may comprise at least one color. In many embodiments, the pattern comprises a combination of colors and/or a different shades of the same color. In some embodiments, the exterior surface of the water pan 14 comprises a first pattern, and the holding portion 16 of the water pan 14 comprises a second pattern, where the first pattern is different from the second pattern. The same may be true for the exteriors and interiors of at least one of the food pan 18, platter 26, and lid 22. In some embodiments, at least two of the water pan 14, food pan 18, platter 26, and lid 22 comprise the same color and/or pattern on at least one of the exterior surface and interior portion. The chafing dish sets 10a, 10b, and/or 10c may comprise any color and/or pattern regardless of form factor. The variety of designs, colors, and/or patterns may enable a user of the set 10a, 10b, and/or 10c to "mix and match" different components to create a unique and aesthetically pleasing presentation.

As mentioned with reference to FIG. 2, in some embodiments, the water pan 14 comprises a hammered surface 32. At least one of the food pan 18, platter 26, chafing fuel cover 34, and chafing fuel base 44 may also comprise the hammered surface 32 (as indicated throughout the Figures). Though not shown, in some embodiments, at least one of the stand 12 and the lid 22 also comprise a hammered surface 32. At least one of the stand 12, water pan 14, food pan 18, platter 26, lid 22, chafing fuel cover 34, and chafing fuel base 44 may comprise a non-hammered, substantially smooth, opaque surface. In many embodiments, at least one of the stand 12, water pan 14, food pan 18, platter 26, lid 22, chafing fuel cover 34, and chafing fuel base 44 are comprised of stainless-steel. At least one of the stand 12, water pan 14, food pan 18, platter 26, lid 22, chafing fuel cover 34, and chafing fuel base 44 may comprise a clear surface. The surface of at least one of the stand 12, water pan 14, food pan 18, platter 26, lid 22, chafing fuel cover 34, and chafing fuel base 44 may comprise a stain, coating, or texture other than a hammered texture.

Figure 18:
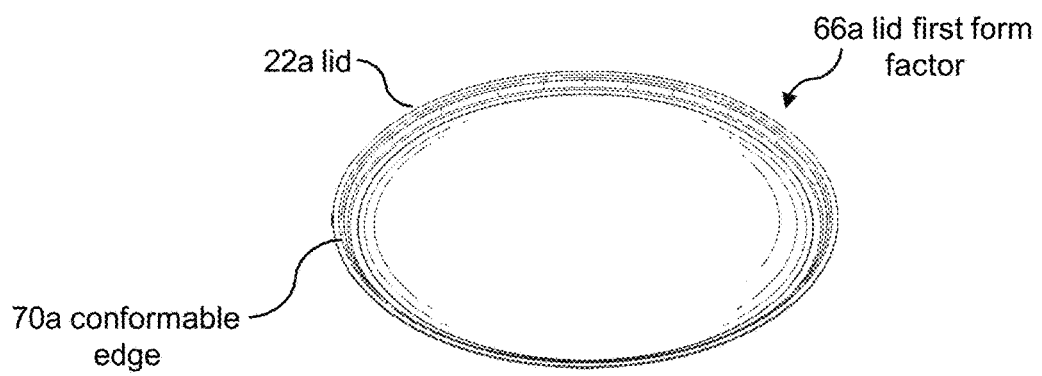
FIGS. 18, 19, 20, 21, 22, 23, 24, 25, and 26 illustrate perspective views of different lids of a chafing dish set, according to some embodiments.
Figure 19:
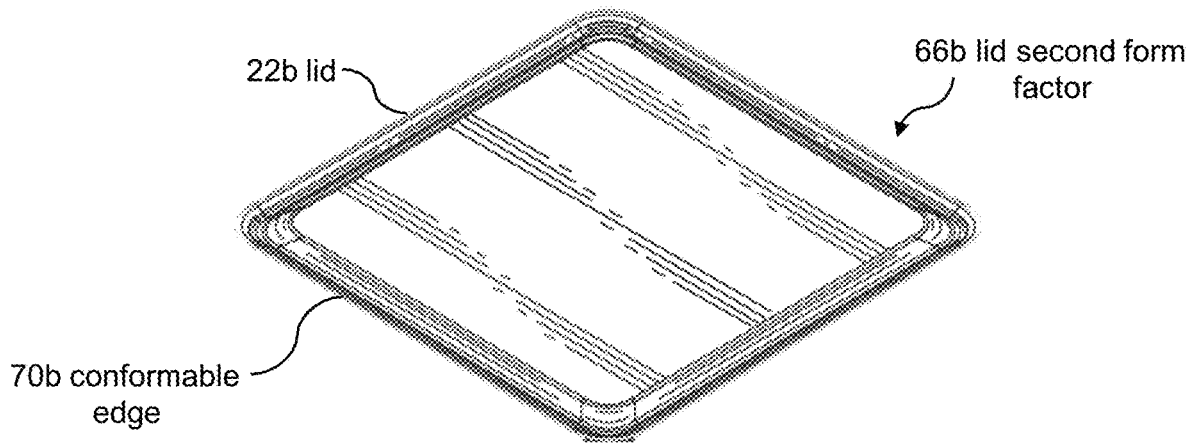
Figure 20:
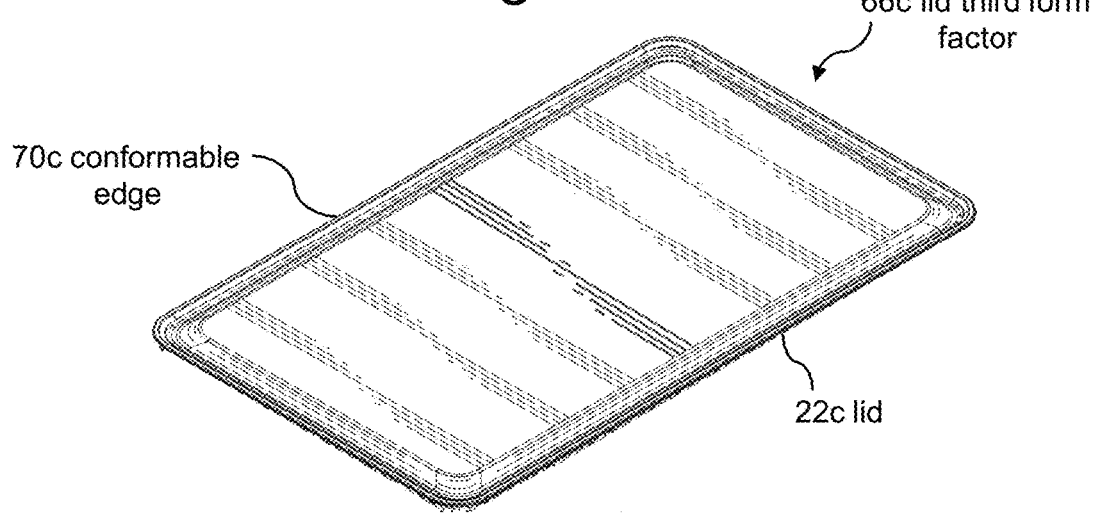

In some embodiments, at least one of the chafing dish set 10a, the set 10b, and the set 10c is configured to be disposable. At least one of the stand 12, the water pan 14, the food pan 18, the platter 26, the lid 22, the chafing fuel cover 34, and the chafing fuel base 44 of the disposable set(s) 10a, 10b, and/or 10c may be comprised of aluminum or any other suitable recyclable and/or disposable material. In some embodiments, the lid 22a, 22b, and/or 22c of a disposable set 10a, 10b, and/or 10c does not include a knob, as indicated in FIGS. 18-20. As also shown in FIGS. 18-20, the lid 22a, 22b, and/or 22c of a disposable set 10a, 10b, and/or 10c may include a conformable edge 70a, 70b, and/or 70c configured to securely fit around an upper edge of at least one of the water pan 14, the food pan 18, and the platter 26.

The disposable set(s) 10a, 10b, and/or 10c may comprise the hammered surface 32, which may comprise a stainless-steel coating over the aluminum, or other suitable material, in order to provide a more aesthetically pleasing appearance and give even the disposable set 10a, 10b, and/or 10c a "real" look of stainless steel. The stainless-steel coating may be made of real stainless steel, or may comprise a different metal configured to look like stainless steel.

The surface of at least one of the stand 12, water pan 14, food pan 18, platter 26, lid 22, chafing fuel cover 34, and chafing fuel base 44 may comprise a stain, coating, or texture other than a hammered surface. In addition, the surface of at least one of the stand 12, water pan 14, food pan 18, platter 26, lid 22, chafing fuel cover 34, and chafing fuel base 44 may comprise a "real look" metallic finish of a metal other than stainless steel; for example, copper, carbon steel, cast iron, or the like. The "real look" finish may comprise the desired metal, or a different metal configured to look like the desired metal. The surface may also comprise a "real look" of a non-metallic material such as clay, stoneware, or ceramic. In some embodiments, the disposable set(s) 10a, 10b, and/or 10c do not comprise the hammered surface 32, and instead comprise a smooth stainless-steel coating. The disposable set(s) 10a, 10b, and/or 10c may comprise a non-hammered textured surface. As also indicated in FIGS. 18-20, each of the lids 22a, 22b, and 22c may define a lid first form factor 66a, a lid second form factor 66b, and a lid third form factor 66c, respectively.

Figure 15:
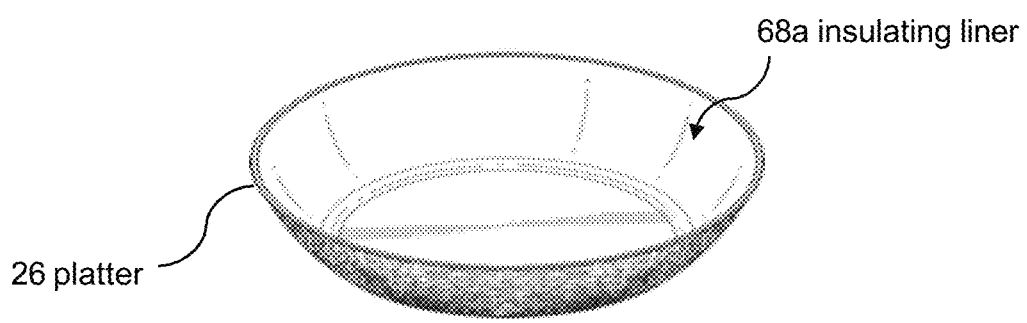
FIGS. 15, 16, and 17 illustrate perspective views of a chafing dish set including an insulating liner, according to some embodiments.
Figure 16:
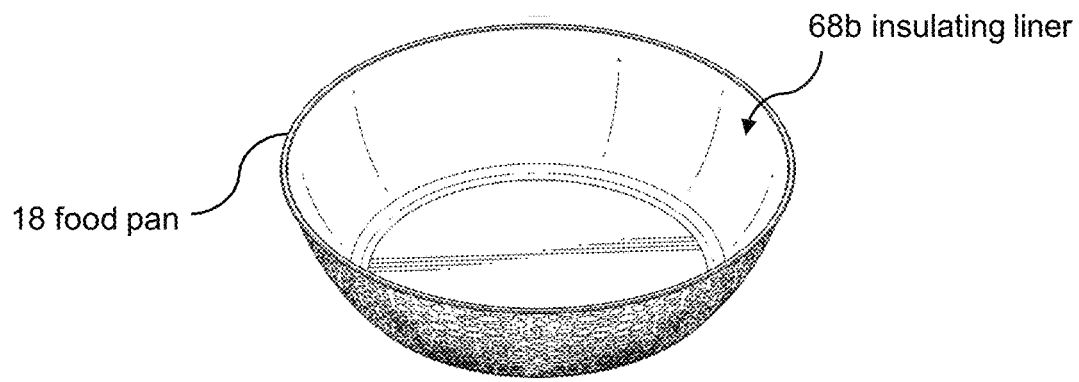
Figure 17:
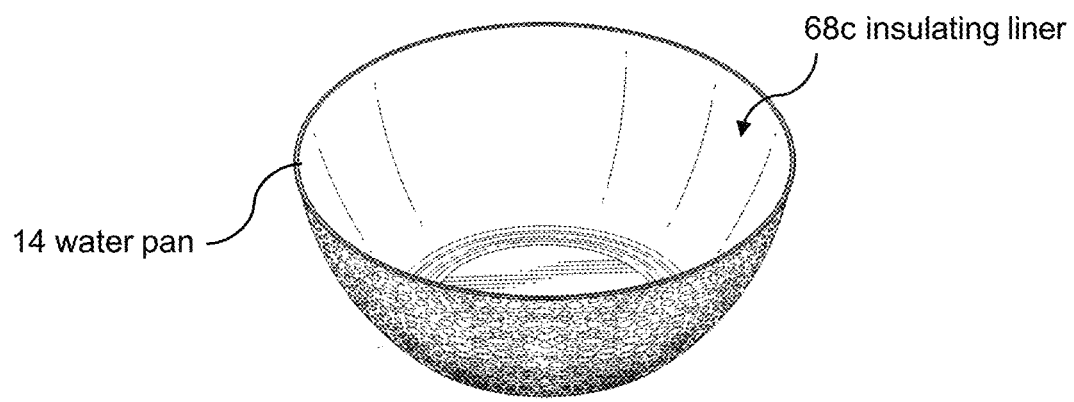

At least one of a disposable set 10a, 10b, and/or 10c and a non-disposable set 10a, 10b, and/or 10c may comprise an insulating liner 68 on at least one of the water pan 14, the food pan 18, and the platter 26, wherein the insulating liner 68 is configured to insulate the water pan 14, food pan 18, and/or platter 26 and enable temperature maintenance. FIGS. 15-17, respectively, illustrate the platter 26 with an insulating liner 68a, the food pan 18 with an insulating liner 68b, and the water pan 14 with an insulating liner 68c. In some embodiments, only one of the platter 26, food pan 18, and water pan 14 includes an insulating liner 68. In many embodiments, only the water pan 14 includes an insulating liner 68. The insulating liner 68 may prevent temperature fluctuation by enabling the platter 26, food pan 18, and/or water pan 14 to retain either heat or cold, depending on the setup of the chafing dish set 10 (e.g., retain heat from a chafing fuel canister located below the water pan 14 or retain cold from ice, cold water, or the like located in the water pan 14). In many embodiments, the insulating liner 68 comprises a thermal liner that provides an extra layer of insulation to the platter 26, food pan 18, and/or water pan 14. The insulating liner 68 may comprise at least one layer of an appropriate material, such as metal (e.g., aluminum or stainless steel), a heat resistant plastic, silicone, or glass. In many embodiments, the insulating liner 68 is comprised of food-safe materials. The insulating liner 68 may be reusable. In some embodiments, the insulating liner 68 is removably coupled to at least one of the platter 26, food pan 18, and/or water pan 14. The insulating liner 68 may be integrated into an interior surface of at least one of the platter 26, food pan 18, and/or water pan 14.

Figure 21:
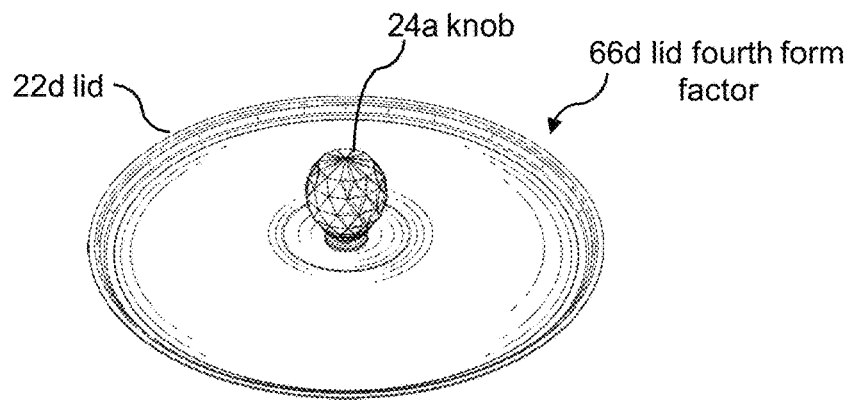
Figure 22:
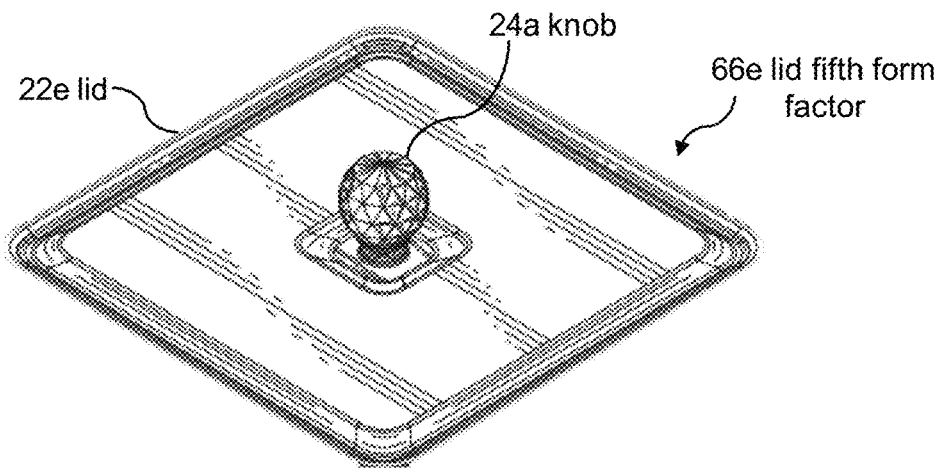
Figure 23:
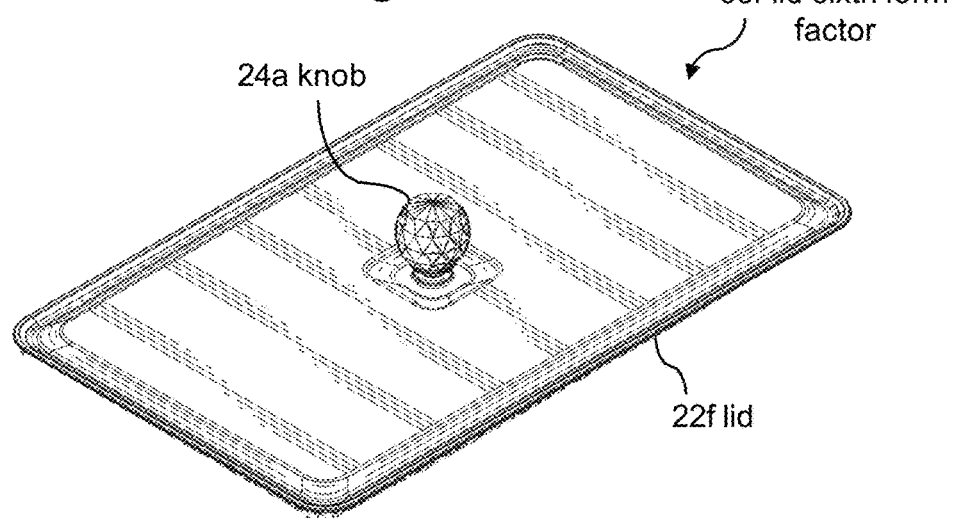

FIGS. 21-23 illustrate the lids 22d, 22e, and 22f, respectively, with the same style knob 24 illustrated in some of the previous figures (e.g., FIGS. 1, 2, 4, 5, 7, 8, 13, and 14). This style knob may be referred to as the knob 24a, as indicated in FIGS. 21-23. As discussed above with reference to FIGS. 18-20, in some embodiments, the lid 22 does not have a knob 24. The lid 22 may also have a different style knob 24b, as shown in FIGS. 24-39 on the lid 22g, 22h, and 22i, respectively. It should be noted that the knob 24 may define any shape, color, size, texture, pattern, or other design feature, and the knobs 24a-o shown in FIGS. 21-39 are included as examples and are intended to be nonlimiting. In addition, each lid 22 may comprise more than one knob 24. In some embodiments, the lid 22 comprises a handle rather than a knob 24. FIGS. 21-23 also demonstrate additional embodiments of the lid form factor, including the lid fourth form factor 66d in FIG. 21, the lid fifth form factor 66e in FIG. 22, and the lid sixth form factor 66f in FIG. 23.

Figure 24:
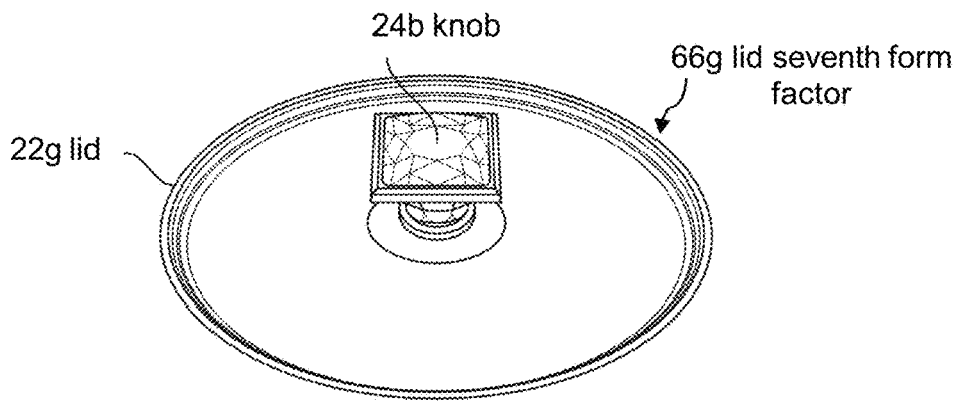
Figure 25:
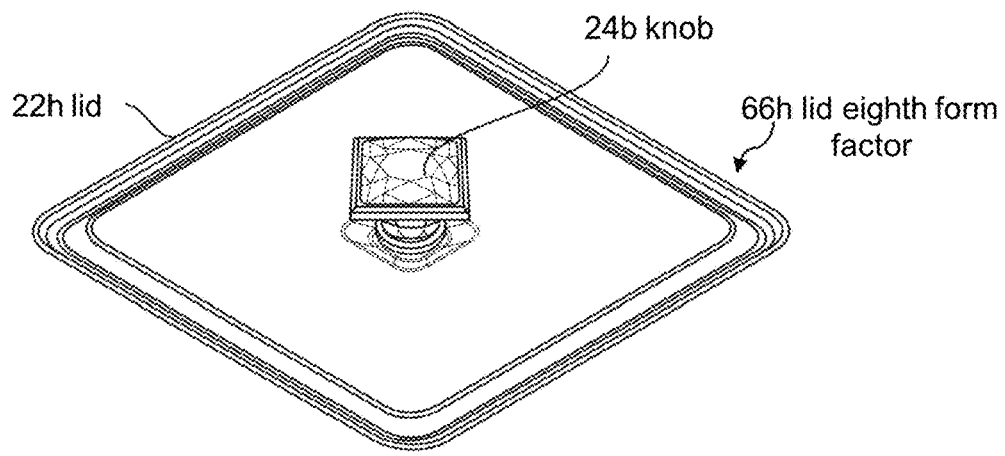
Figure 26:
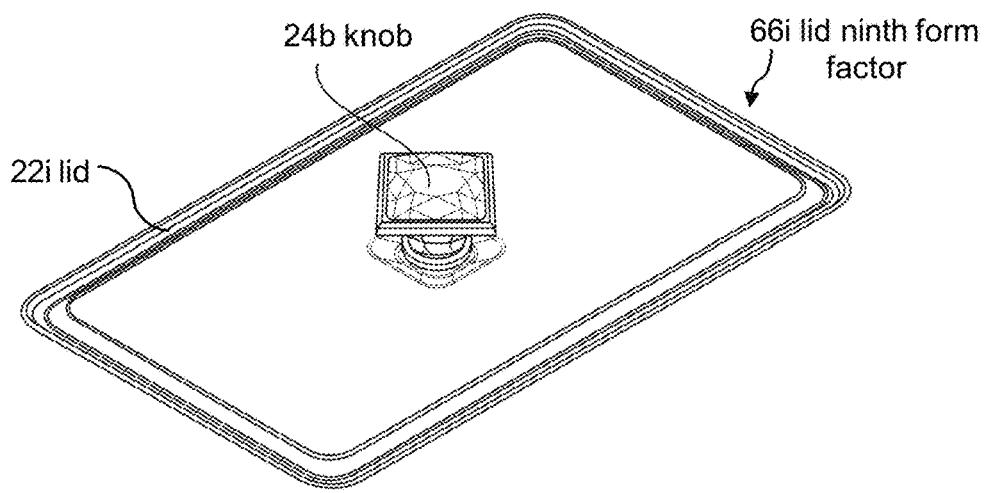

FIGS. 24-26 illustrate the lids 22g, 22h, and 22i, respectively, with a square knob 24b. In some embodiments, as shown in FIGS. 24-26, the square knob 24b includes a faceted portion comprised of crystal, glass, or the like. FIGS. 24-26 also illustrate additional embodiments of the lid form factor, including the lid seventh form factor 66g in FIG. 24, the lid eighth form factor 66h in FIG. 25, and the lid ninth form factor 66i in FIG. 26.

Figure 27:
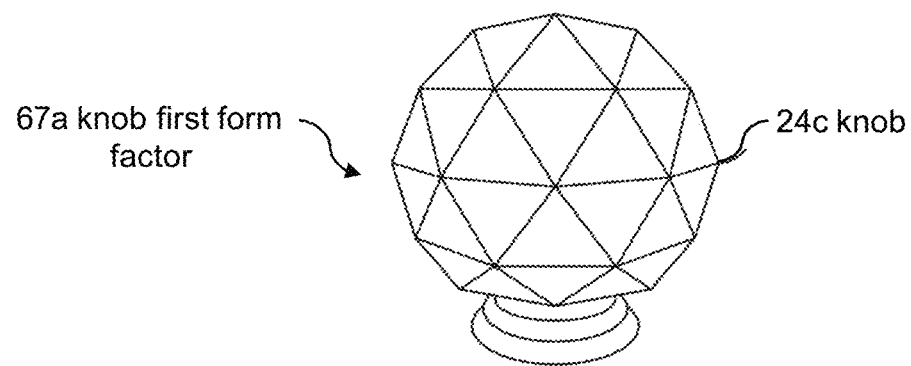
FIGS. 27, 28, 29, 30, 31, 32, 33, 34, 35, 36, 37, 38, and 39 illustrate perspective views of different knobs of a chafing dish set, according to some embodiments.
Figure 28:
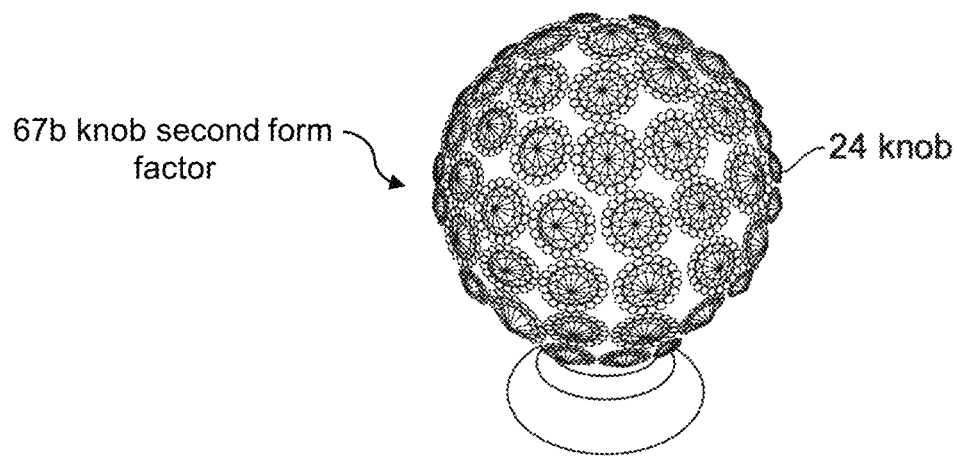
Figure 29:
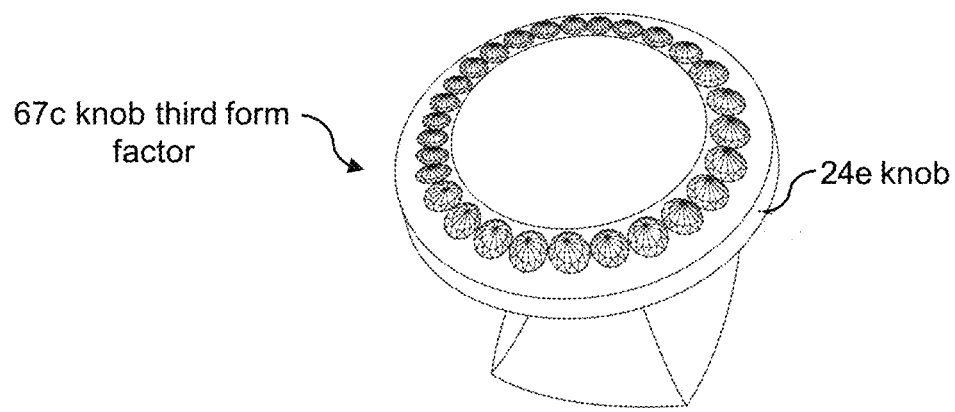
Figure 30:
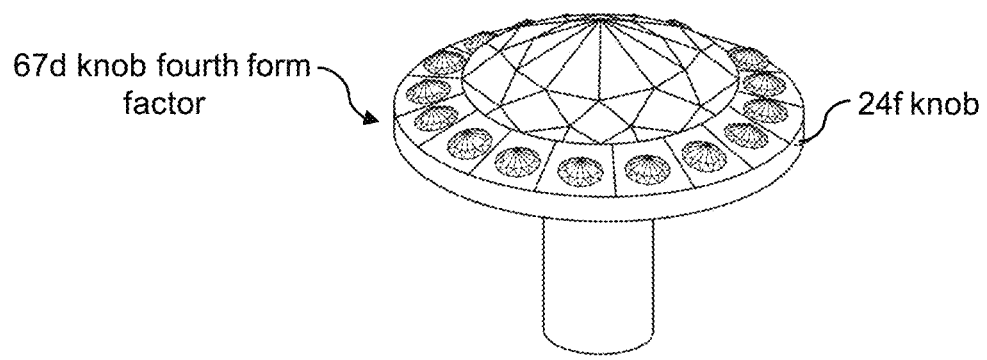
Figure 31:
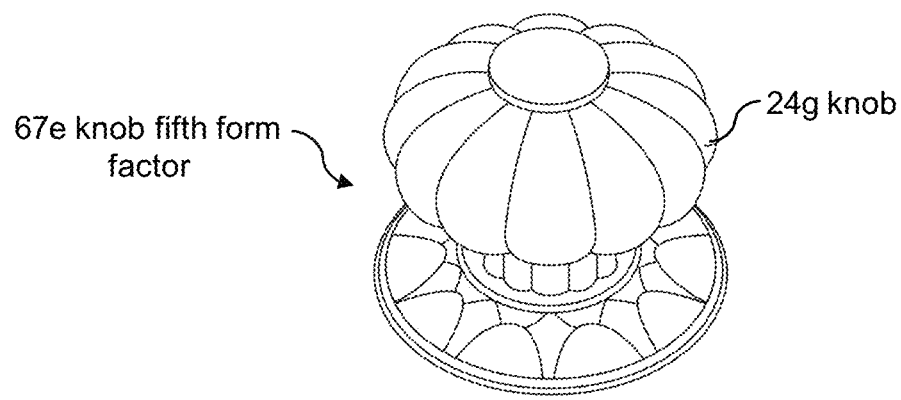
Figure 32:
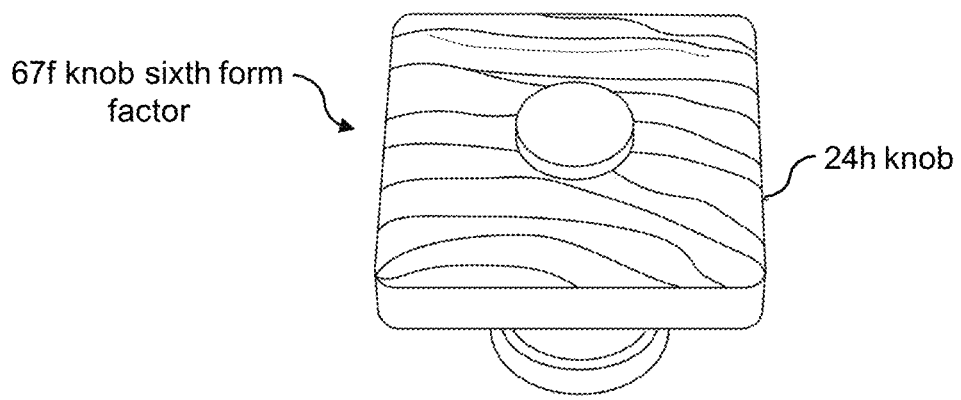
Figure 33:
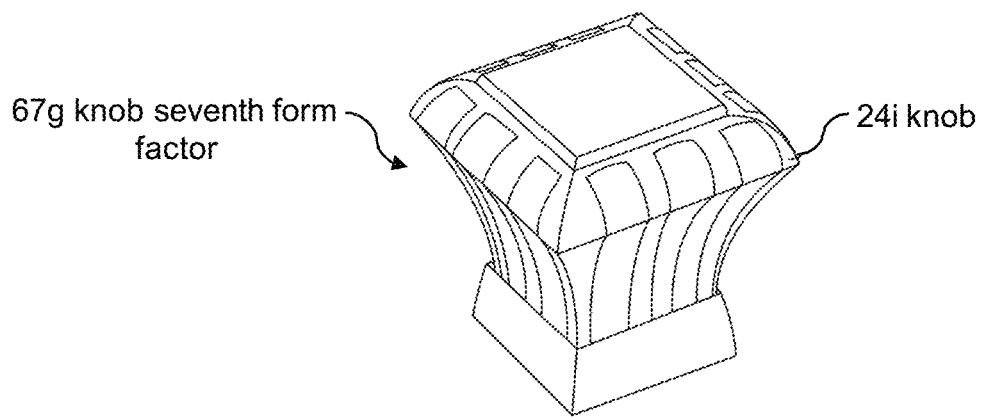

FIGS. 27-39 each illustrate different styles of the knob 24. FIG. 27 shows a knob 24c defining a faceted polyhedron shape, the knob first form factor 67a. FIG. 28 shows a knob 24d defining a substantially spherical shape with a textured surface, the knob second form factor 67b. FIG. 29 shows a knob 24e defining a round shape with a flat surface, the knob third form factor 67c. The flat surface of the knob 24e may include some texture detail, as shown in FIG. 29. FIG. 30 also shows a knob 24f defining a round shape, the knob fourth form factor 67d, but the surface includes a faceted protrusion in the center. In some embodiments, as demonstrated in FIG. 31, the knob 24g defines a non-circular or spherical shape. FIG. 31 shows a knob 24g defining a ridged shape similar to a peeled orange, the knob fifth form factor 67e, but generally oblong rather than generally spherical. FIG. 32 shows a generally square knob 24h with a small protrusion in the center, defining the knob sixth form factor 67f. FIG. 33 shows another generally square knob 24i, but with tapered sides extending down to the base, demonstrating the knob seventh form factor 67g.

Figure 34:
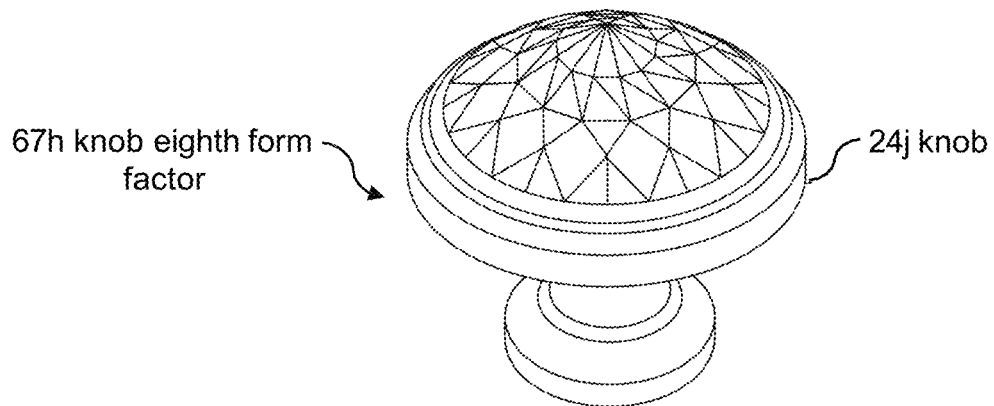
Figure 35:
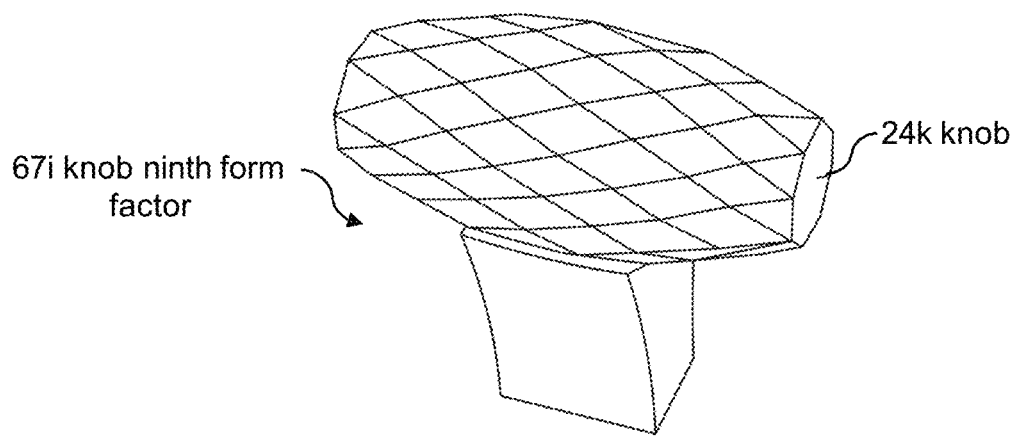
Figure 36:
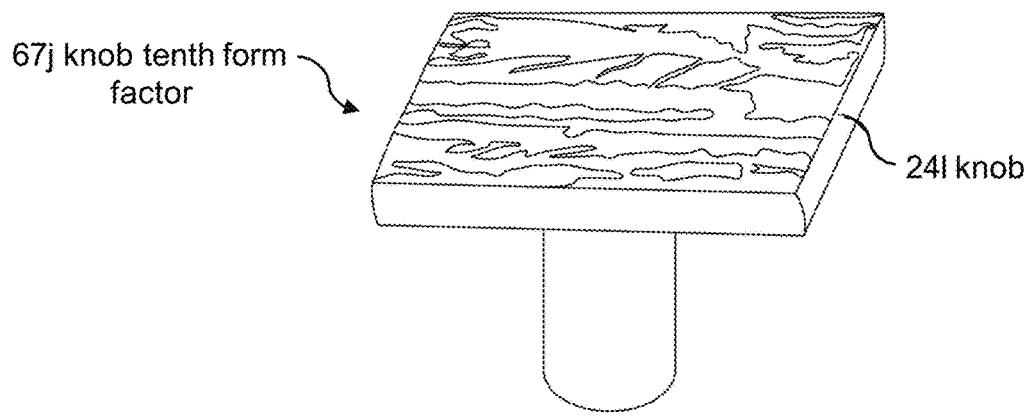
Figure 37:
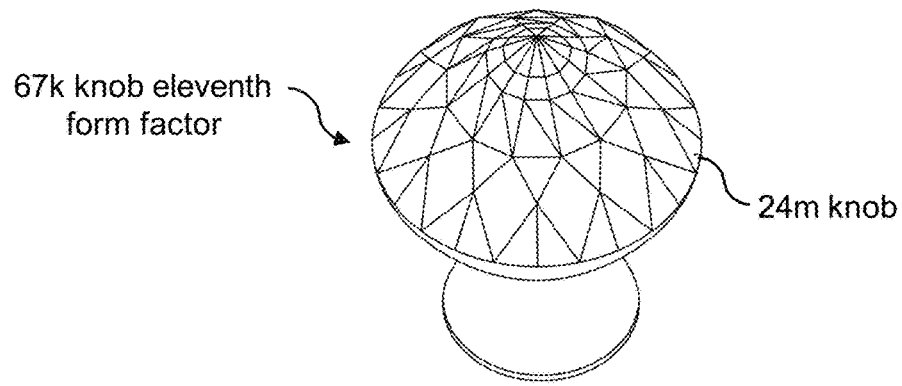
Figure 38:
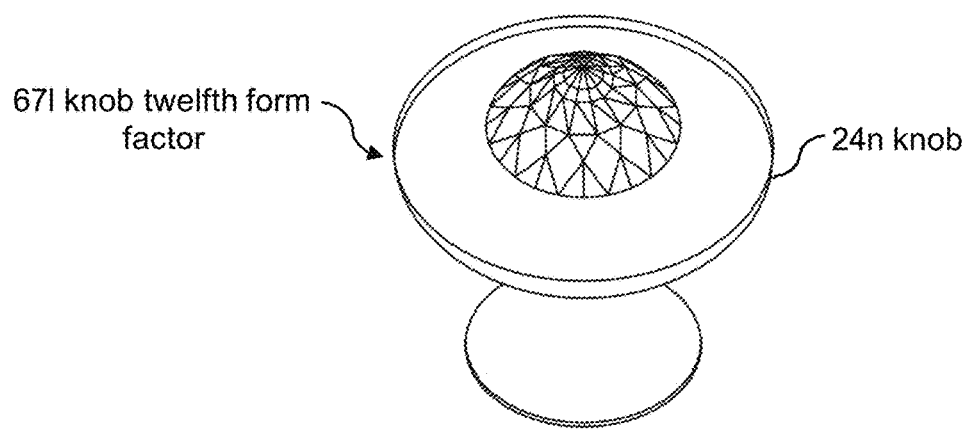
Figure 39:
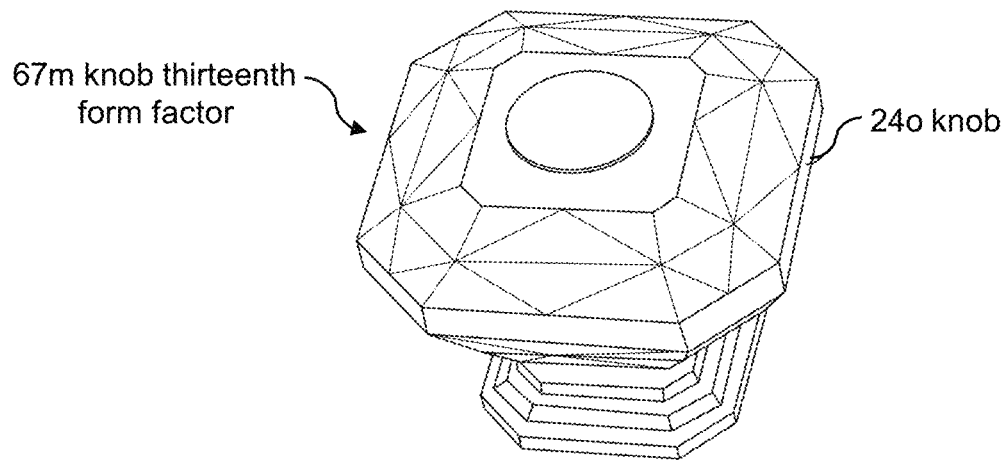

FIG. 34 illustrates a knob 24j similar to the knob 24f shown in FIG. 30, but with a larger faceted protrusion in the center of the round top surface, defining the knob eighth form factor 67h. FIG. 35 shows a knob 24k including a base portion and an elongated and faceted top portion located perpendicular to the base portion, demonstrating the knob ninth form factor 67i. FIG. 36 also shows a knob 24l including a base portion and an elongated top portion located perpendicular to the base portion, but the top portion in FIG. 36 defines a rectangular shape with a textured top surface, the knob tenth form factor 67j. FIG. 37 illustrates a knob 24m defining an oblong spherical shape with a faceted surface, the knob eleventh form factor 67k. FIG. 38 is similar to FIGS. 30 and 34, and again shows a knob 24n defining a generally round shape with a faceted protrusion in the center, the knob twelfth form factor 67l. FIG. 39 shows a knob 24o defining an unequal octagon shape with a faceted surface texture, the knob thirteenth form factor 67m.

The knobs 24 shown in FIGS. 24-39 illustrate only some of the possible shapes, textures, and sizes of the knob 24 included in the chafing dish set 10a, 10b, and/or 10c. In addition, the knobs 24 shown in FIGS. 21-39 may define any color or combination of colors. It should be appreciated that any of the knobs 24 illustrated in the Figures may be included for any of the lids 22 described herein, including a lid 22 defining the first form factor 64a (e.g., a round lid), a lid 22 defining the second form factor 64b (e.g., a square lid), and/or a lid 22 defining the third form factor 64c (e.g., a rectangular lid). As previously mentioned, in many embodiments, the knob 24 is interchangeably coupled to the lid 22. It should be appreciated that any of the knobs 24 shown in the Figures and discussed in this disclosure may be configured to couple to any of the lids 22 shown in the Figures and discussed in this disclosure. For example, the knob 24*a* may be configured to couple to the lid 22*d*, as shown in FIG. 21. The knob 24*a* may be replaced with the knob 24*b*, the knob 24*c*, the knob 24*d*, etc. on the lid 22*d*, depending on the desired aesthetic of the chafing dish set 10. Any of the knobs 24 may couple to the lid 22*e*, the lid 22*f*, etc.

Figure 40:
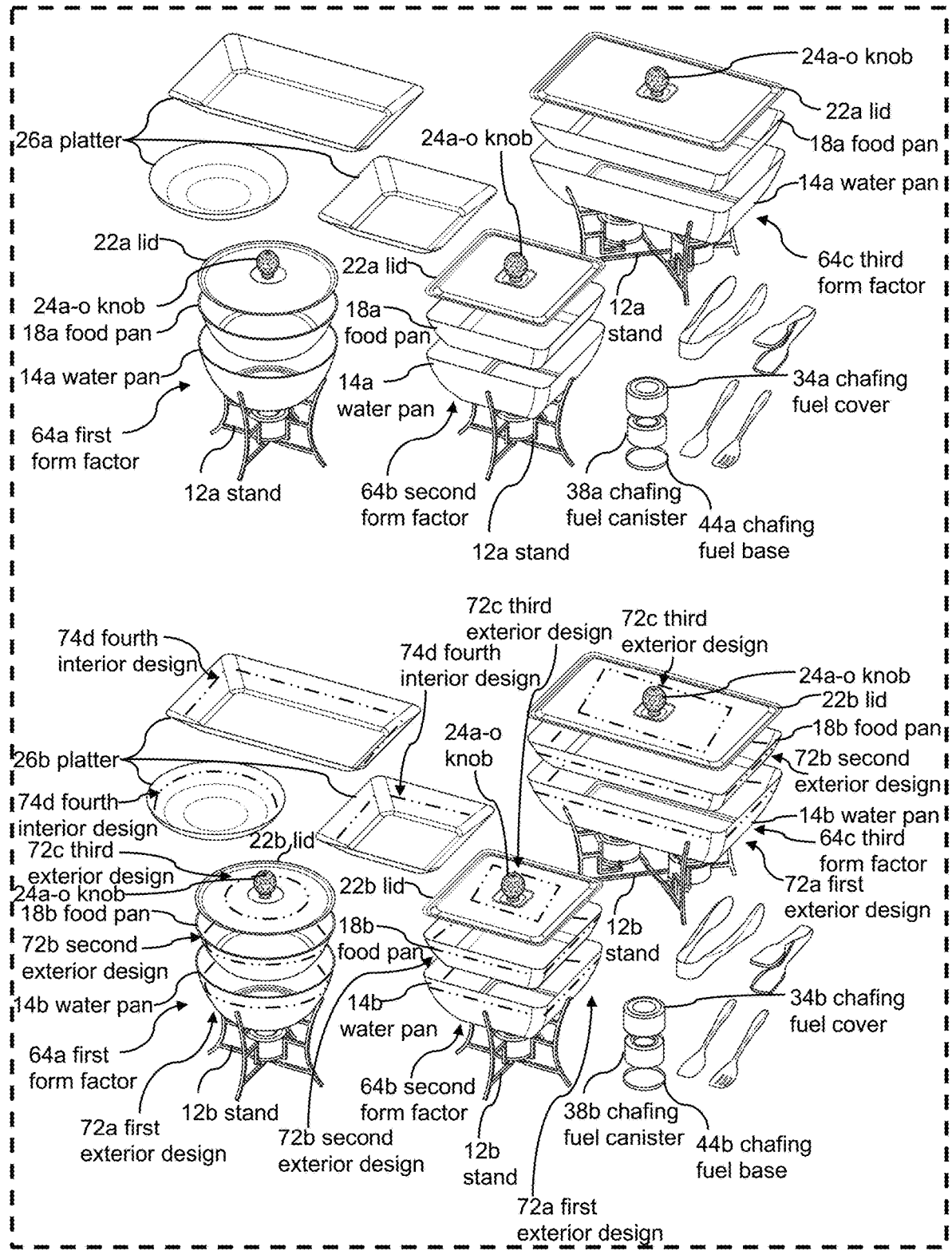
FIG. 40 illustrates perspective views of a chafing dish set, according to some embodiments.

FIG. 40 illustrates two embodiments of the chafing dish set 10. The upper embodiment is similar to the embodiment shown in FIG. 1, and includes a water pan 14*a*, food pan 18*a*, lid 22*a*, and platter 26*a* of the first form factor 64*a*, the second form factor 64*b*, and the third form factor 64*c*. FIG. 40 also includes the stand 12, chafing fuel canister 38, chafing fuel cover 34, and chafing fuel base 44. In many embodiments, as shown in FIG. 40, a knob 24*a-o* is coupled to each lid 22*a* and 22*b*. It should be noted that "24*a-o* knob" is intended to include the knob 24*a*, the knob 24*b*, the knob 24*c*, the knob 24*d*, the knob 24*e*, the knob 24*f*, the knob 24*g*, the knob 24*h*, the knob 24*i*, the knob 24*j*, the knob 24*k*, the knob 24*l*, the knob 24*m*, the knob 24*n*, and/or the knob 24*o*. Stated differently, any one, or multiple, of the knobs 24*a-o* may be coupled to the lid 22*a* and/or the lid 22*b*, as shown in FIG. 40.

As previously mentioned, an exterior surface of the water pan 14*b* may define a first exterior design 72*a*, as shown in the lower embodiment of FIG. 40. In some embodiments, an exterior surface of the food pan 18*b* defines a second exterior design 72*b*, as illustrated in FIG. 40. An exterior surface of the lid 22*b* may define a third exterior design 72*c*. FIG. 40 also shows that, in some embodiments, an interior portion of the platter 26*b* defines a fourth interior design 74*d*. It should be noted that, though not labeled in FIG. 40, in many embodiments, the holding portion of the water pan 14*b* defines a first interior design, the interior portion of the food pan 18*b* defines a second interior design, and an interior portion of the lid 22*b* defines a third interior design. In addition, an exterior surface of the platter 26*b* may define a fourth exterior design. Each of the first exterior design, the first interior design, the second exterior design, the second interior design, the third exterior design, the third interior design, the fourth exterior design, and the fourth interior design may define at least one of at least one color and at least one pattern. As demonstrated in FIG. 40, the pattern may comprise a dash-dot design.

In some embodiments, and as illustrated in FIG. 40, the first exterior design 72*a* substantially matches the second exterior design 72*b* and the third exterior design 72*c*. The fourth exterior design may also substantially match the first exterior design 72*a*, the second exterior design 72*b*, and the third exterior design 72*c*. The first interior design may substantially match the second interior design, the third interior design, and the fourth interior design 74*d*. The first exterior design 72*a*, second exterior design 72*b*, third exterior design 72*c*, and fourth exterior design may be different from the first interior design, second interior design, third interior design, and fourth interior design 74*d*. In some embodiments, the first exterior design 72*a*, second exterior design 72*b*, third exterior design 72*c*, and fourth exterior design substantially match the first interior design, second interior design, third interior design, and fourth interior design 74*d*.

The chafing dish set 10 may also include additional elements not shown in the Figures. For example, in some embodiments, the set 10 includes at least one serving utensil. The at least one serving utensil may comprise at least one serving spoon, at least one serving fork, at least one spatula, at least one pair of tongs, and/or any other suitable serving utensil. In many embodiments, the at least one serving utensil comprises a hammered surface substantially similar to the hammered surface 32 of the other elements of the chafing dish set 10.

Figure 41:
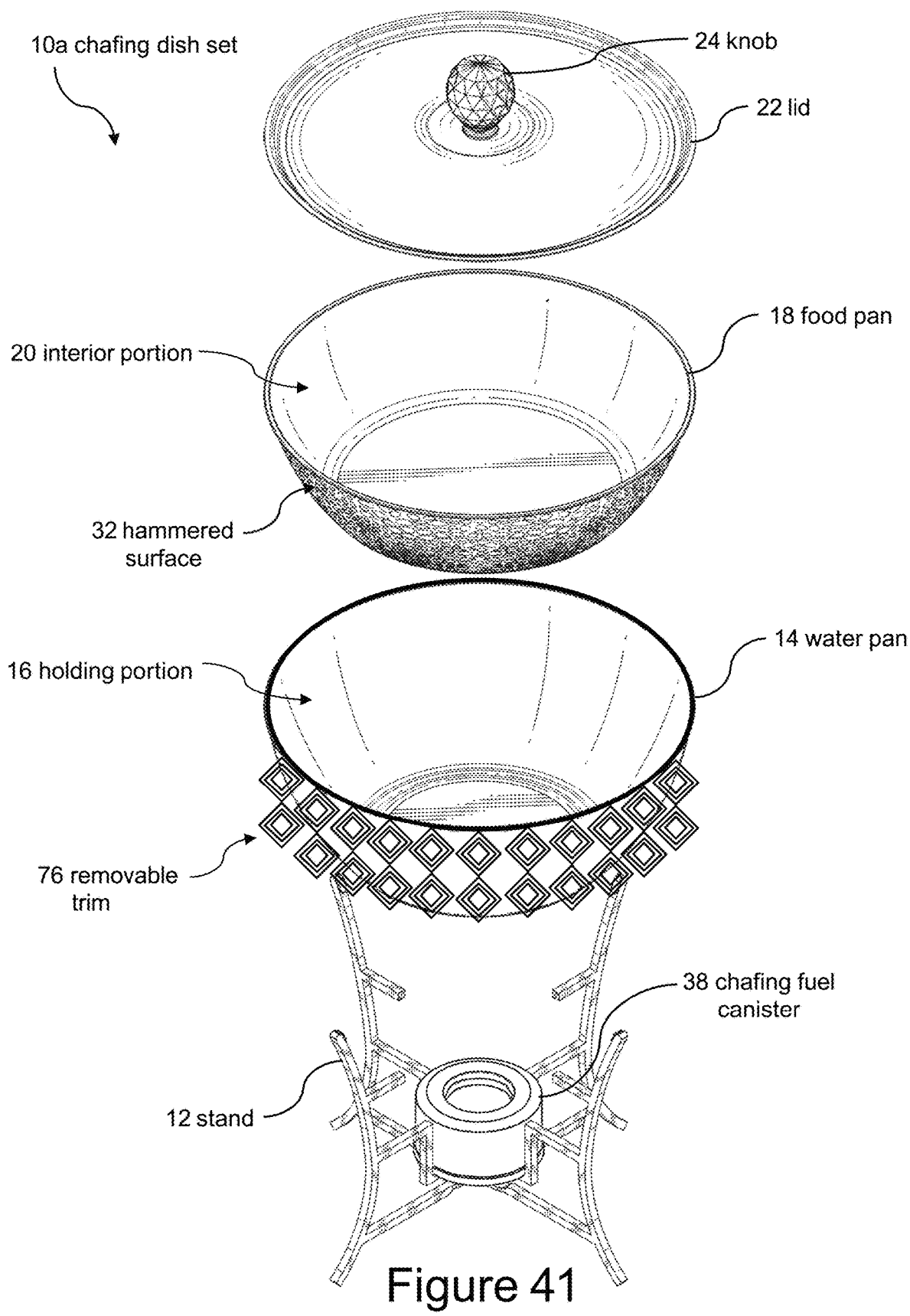
FIG. 41 illustrates an exploded view of a chafing dish set, according to some embodiments.

As shown in FIG. 41, the chafing dish set 10 may include additional aesthetic elements, such as a removable trim 76 located around a perimeter of the water pan 14. The removable trim 76 may also be located around a perimeter of the stand 12, food pan 18, and/or platter 26. In many embodiments, the removable trim 76 extends around substantially an entire perimeter of the stand 12, water pan 14, food pan 18, and/or platter 26. The removable trim 76 may extend around at least a portion of the perimeter of the stand 12, water pan 14, food pan 18, and/or platter 26. In some embodiments, the removable trim 76 extends downward from the perimeter, as illustrated in FIG. 41. For example, when located around a perimeter of the water pan 14, the trim 76 may extend downward to cover the stand 12. When the stand 12 is coupled to the chafing fuel canister 38, the trim 76 may obstruct the view of the chafing fuel canister 38. As such, the trim 76 may serve as decoration to the stand 12, water pan 14, food pan 18, and/or platter 26, and may also hide from view less aesthetically pleasing elements of the chafing dish set 10, such as the chafing fuel canister 38, when the chafing fuel canister 38 is not coupled to the chafing fuel cover 34 and/or the chafing fuel base 44. In some embodiments, the trim 76 does not extend the full height of the stand 12, such that the chafing fuel canister 38 (when coupled to the chafing fuel cover 34 and/or the chafing fuel base 44) is visible below the decorative removable trim 76. In some embodiments, the trim 76 does not extend downward and is configured to be a decorative accessory around the perimeter of the water pan 14, food pan 18, and/or platter 26. When coupled to the removable trim 76, the water pan 14, food pan 18, and/or platter 26 may not include the hammered surface 32. For example, FIG. 41 demonstrates the removable trim 76 coupled to the water pan 14 without the hammered surface 32, while the food pan 18 does include the hammered surface 32. In some embodiments, the removable trim 76 is coupled to the water pan 14, food pan 18, and/or platter 26 when the water pan 14, food pan 18, and/or platter 26 does include the hammered surface 32. The removable trim 76 may be configured to couple to the lid 22. In some embodiments, the removable trim 76 hangs from the perimeter of a pan, such as the water pan 14. In this regard, a top portion of the removable trim 76 may be directly coupled to the water pan 14, and the bottom portion of the removable trim 76 may hang freely.

The trim may be removably coupled to the stand 12, water pan 14, food pan 18, and/or platter 26. In some embodiments, the chafing dish set 10 comprises different styles of trim, including different design patterns (e.g., floral, themed (holiday, occasion), custom monogram, etc.), colors, materials, and/or lengths. For example, one style of trim may comprise strands of crystals while another style comprises tassels, chiffon, ribbons, or the like. The trim may comprise beading, rhinestones, other jeweled accents, and any number of other style/design/material elements. It should be noted that, in many embodiments, the trim comprises flame-retardant and/or non-flammable materials. The trim may be configured such that it does not come into contact with a flame emitting portion 42 of the chafing fuel canister 38.

Figure 42:
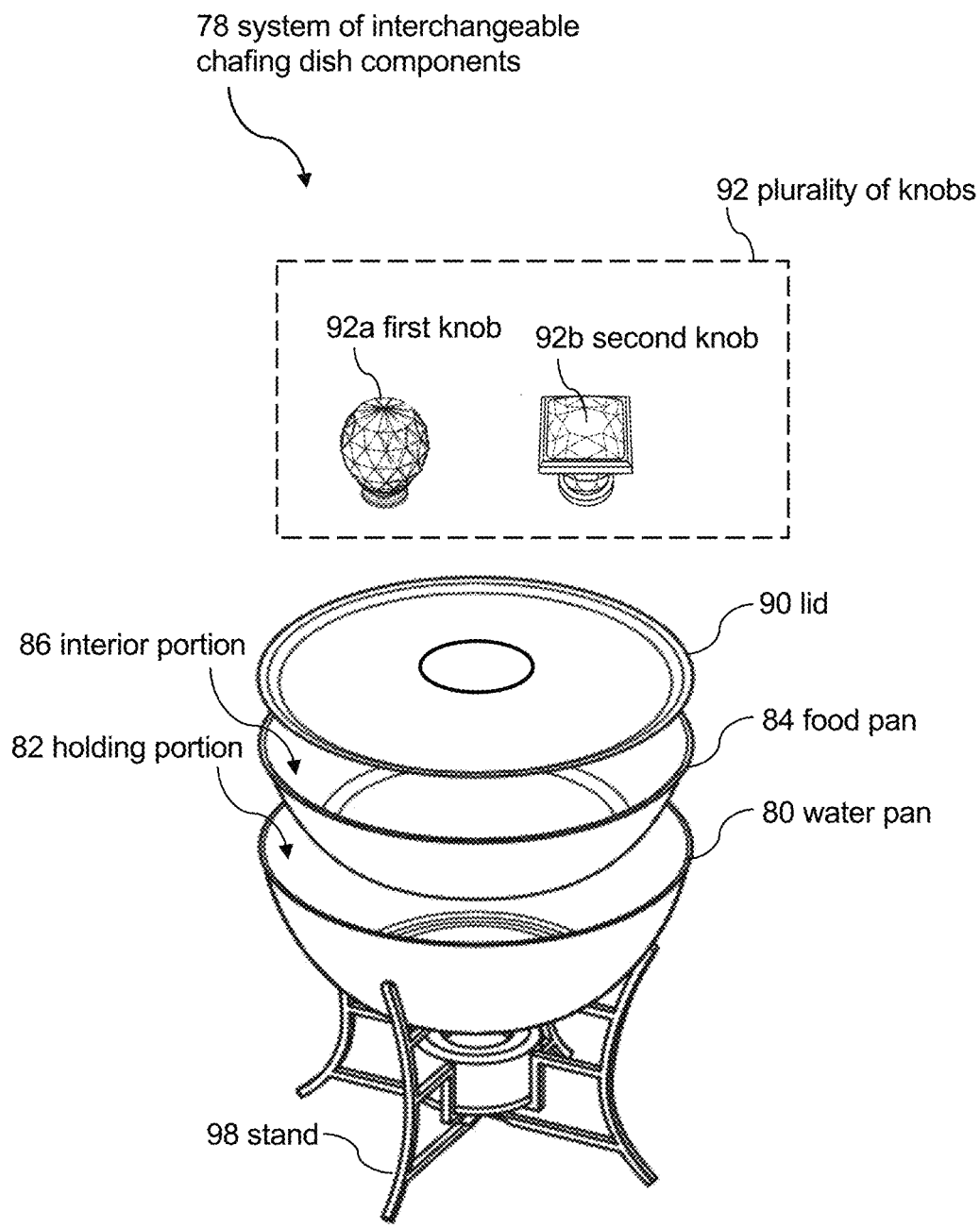
FIG. 42 illustrates a perspective view of a system of interchangeable chafing dish components, according to some embodiments.

FIG. 42 illustrates a perspective view of a system of interchangeable chafing dish components 78. In some embodiments, the system 78 is substantially similar to the chafing dish set 10. As shown in FIG. 42, the system 78 may include a water pan 80, a food pan 84, a lid 90, a plurality of knobs 92, and a stand 98. Similar to the water pan 14 of the chafing dish set 10, the water pan 80 may include a holding portion 82 configured to receive and hold at least one of liquid and ice. Further, similar to the food pan 18, the food pan 84 may include an interior portion 86 configured to receive and hold at least one of a food and a liquid. In some embodiments, the food pan 84 is capable of being restably coupled to the water pan 80. The system 78 may also include a lid 90 capable of being interchangeably coupled to at least one of the water pan 80 and the food pan 84. In some embodiments, the system 78 also includes a plurality of knobs 92 comprising a first knob 92a and a second knob 92b, as shown in FIG. 42. The first knob 92a may be different from the second knob 92b. Both the first knob 92a and the second knob 92b may be capable of being interchangeably coupled to the lid 90. In some embodiments, the lid 90 is substantially similar to the lid 22 of the chafing dish set 10. The plurality of knobs 92 may include any one or multiple of the knobs 24 shown in FIGS. 21-39.

Figure 43:
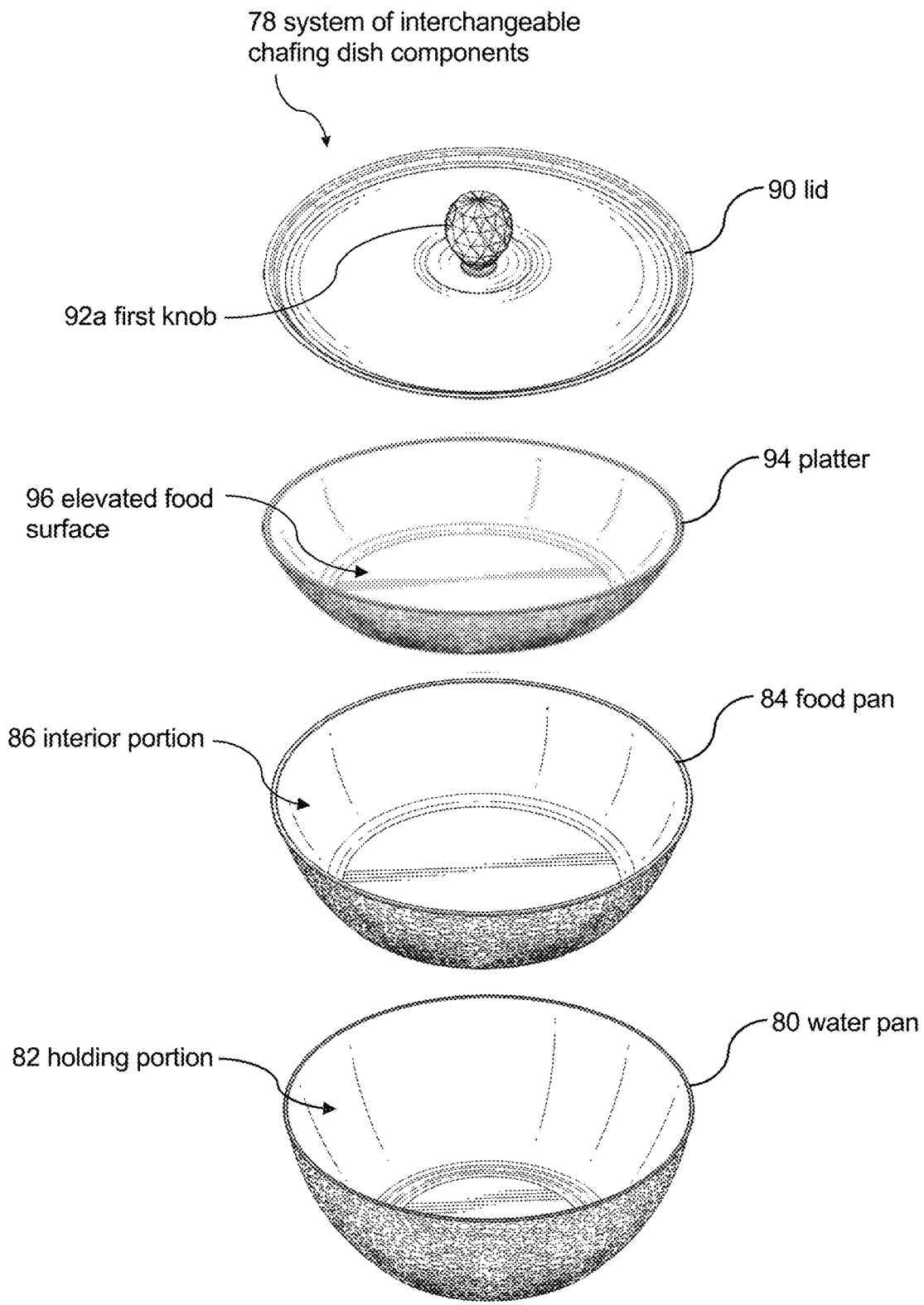
FIG. 43 illustrates an exploded view of a system of interchangeable chafing dish components, according to some embodiments.

FIG. 43 illustrates that, in some embodiments, the system 78 includes a platter 94 capable of being restably coupled to at least one of the water pan 80 and the food pan 84. The lid 90 may be restably coupled to the platter 94. In some embodiments, the platter 94 comprises an elevated food surface 96 configured to sit within at least one of the holding portion 82 of the water pan 80 and the interior portion 86 of the food pan 84. Similar to the other elements of the system 78, the platter 94 may be substantially similar to the platter 26 of the chafing dish set 10. In some embodiments, the platter 94 is capable of restably coupling entirely within the interior portion 86 of the food pan 84, and the food pan 84 is capable of restably coupling entirely within the holding portion 82 of the water pan 80.

Figure 44:
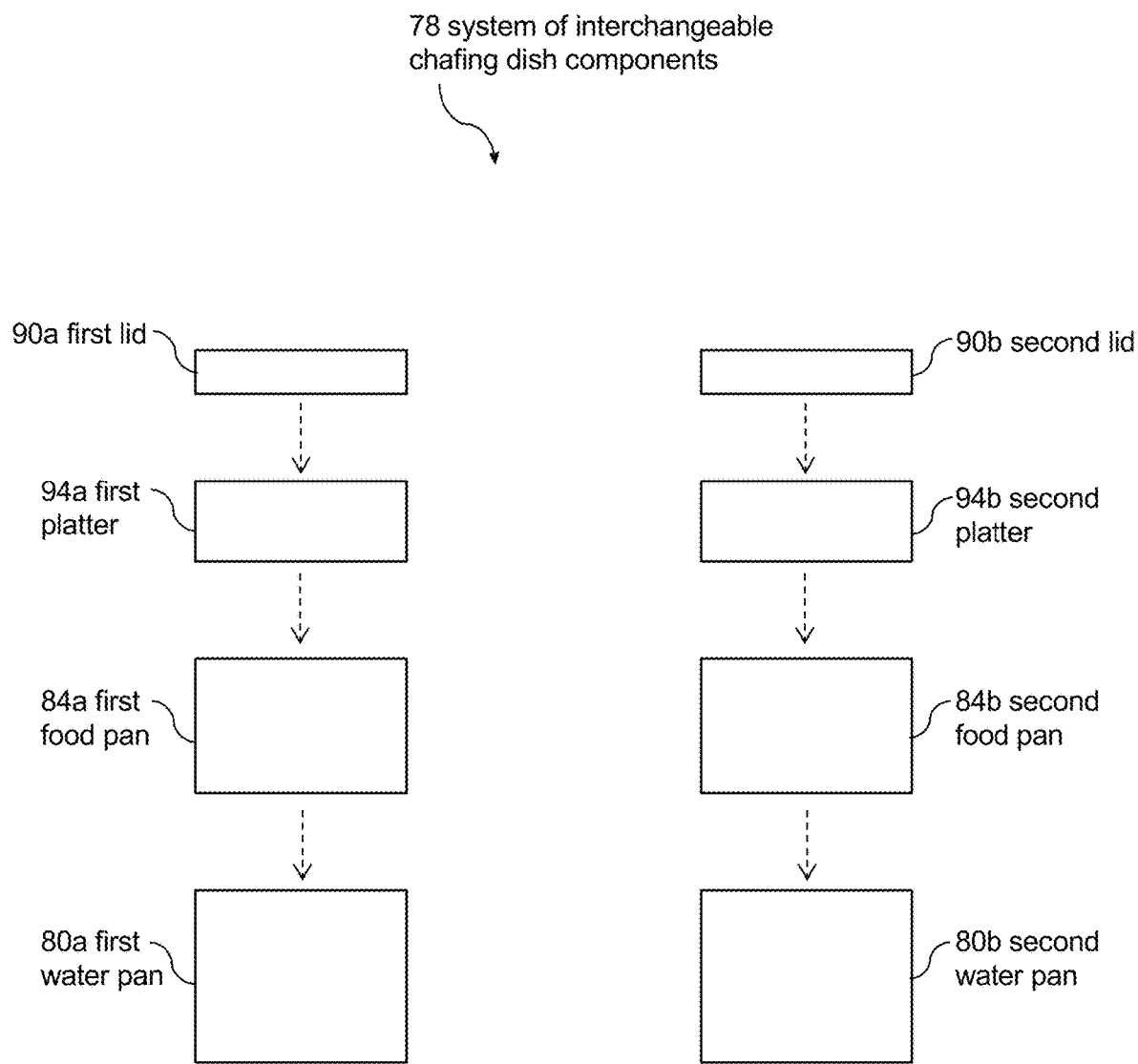
FIGS. 44 and 45 illustrate schematics of a system of interchangeable chafing dish components, according to some embodiments.
Figure 45:
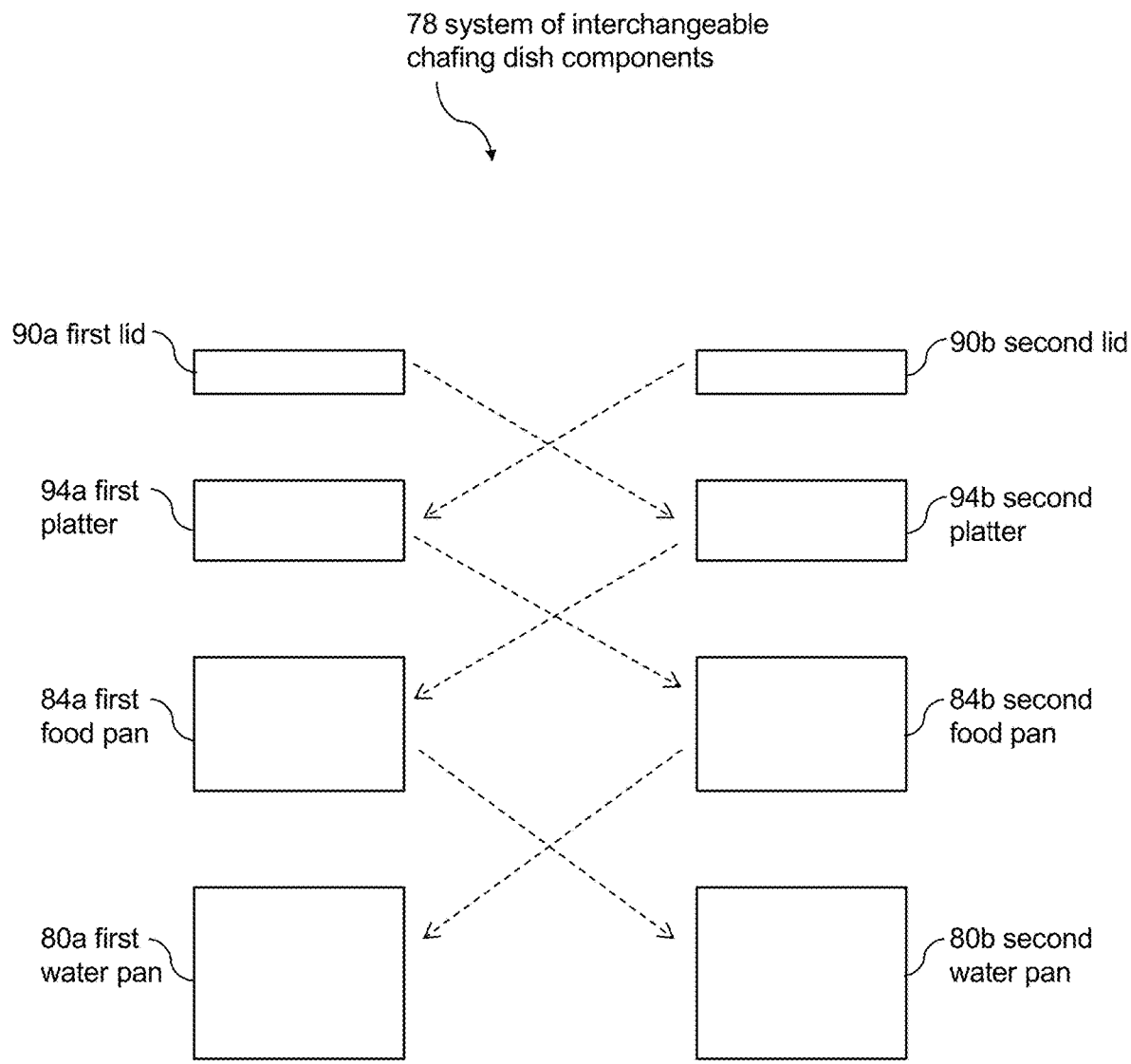

FIGS. 44 and 45 show schematic views of the system 78. In some embodiments, the system 78 includes a first water pan 80a, a second water pan 80b, a first food pan 84a, a second food pan 84b, a first platter 94a, a second platter 94b, a first lid 90a, and a second lid 90b. As shown in FIG. 44, the first lid 90a may be configured to couple to the first platter 94a, which may be configured to couple to the first food pan 84a, which may be configured to couple to the first water pan 80a. Similarly, the second lid 90b may be configured to couple to the second platter 94b, which may be configured to couple to the second food pan 84b, which may be configured to couple to the second water pan 80b. It should be noted that as previously mentioned, the platter 94 may restably couple directly to the water pan 80, rather than to the food pan 84. Additionally, the lid 90 may be configured to couple to any one of the platter 94, the food pan 84, and the water pan 80.

FIG. 45 illustrates interchangeable coupling among elements of the system 78. For example, as indicated by the dashed arrows, in some embodiments the first lid 90a is configured to couple to the second platter 94b, which is configured to couple to the first food pan 84a, which in turn is configured to couple to the second water pan 80b. Similarly, the second lid 90b may be configured to couple to the first platter 94a, which may be configured to couple to the second food pan 84b, which in turn may be configured to couple to the first water pan 80a. It should be understood that any of the elements of the system 78 may be configured to interchangeably couple in any number of possible variations and configurations, and the variations shown in FIGS. 44 and 45 are intended to be non-limiting examples.

Figure 46:
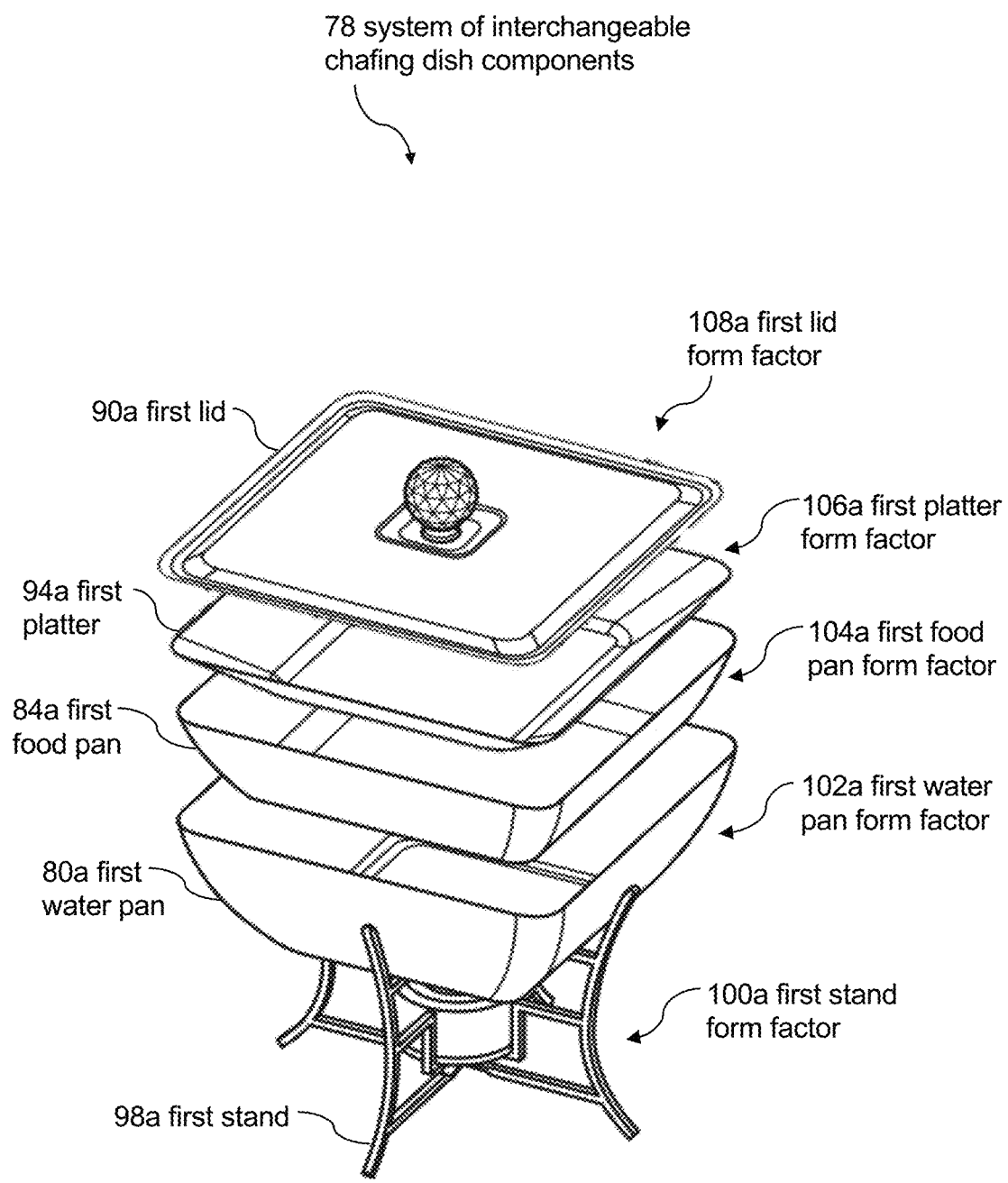
FIG. 46 illustrates a system of interchangeable chafing dish components defining a first form factor, according to some embodiments.

FIG. 46 shows the system 78 including a first stand 98a, the first water pan 80a, the first food pan 84a, the first platter 94a, and the first lid 90a. In some embodiments, as illustrated, the first stand 98a defines a first stand form factor 100a, the first water pan 80a defines a first water pan form factor 102a, the first food pan 84a defines a first food pan form factor 104a, the first platter 94a defines a first platter form factor 106a, and the first lid 90a defines a first lid form factor 108a. The term "form factor" may be used to describe at least one of the size and shape of any of the elements of the system 78. For example, as shown in FIG. 46, the form factor of each of the first water pan 80a, the first food pan 84a, the first platter 94a, and the first lid 90a defines a roughly square-shaped element. It should be understood that any of the elements of the system 78 may define any number of possible shapes, including square, circle, oval, triangle, any novelty shape (e.g., star-shaped, heart-shaped, clover-shaped, etc.), or rectangle, as illustrated in FIG. 47.

Figure 47:
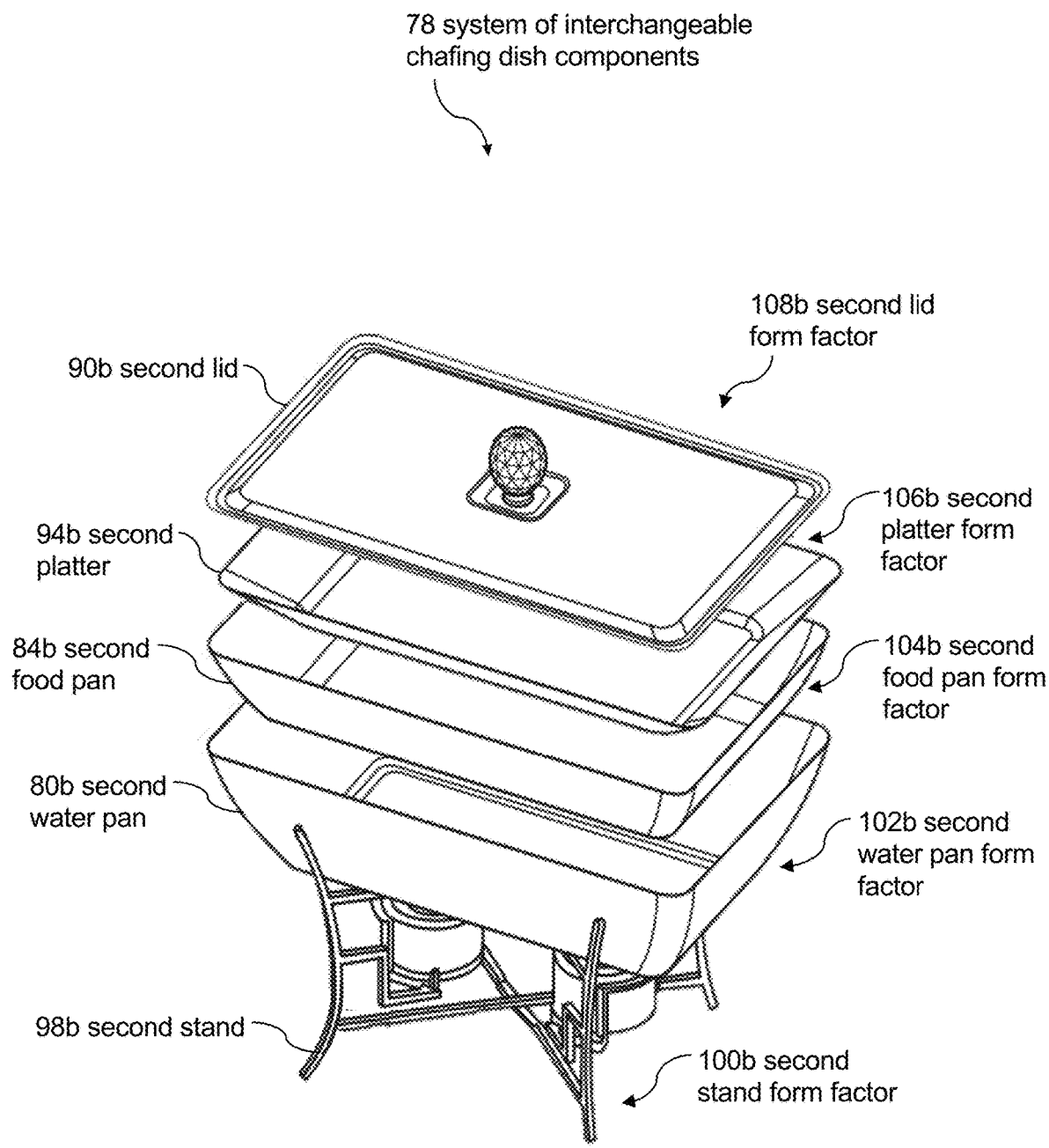
FIG. 47 illustrates a system of interchangeable chafing dish components defining a second form factor, according to some embodiments.

FIG. 47 shows the system 78 including a second stand 98b, the second water pan 80b, the second food pan 84b, the second platter 94b, and the second lid 90b. In some embodiments, the second stand 98b defines a second stand form factor 100b, the second water pan 80b defines a second water pan form factor 102b, the second food pan 84b defines a second food pan form factor 104b, the second platter 94b defines a second platter form factor 106b, and the second lid 90b defines a second lid form factor 108b. As shown in FIG. 47, the second form factor may define a large rectangle, rather than the smaller square of the first form factor shown in FIG. 46. In addition, it should be noted that the second stand form factor 100b may be larger than the first stand form factor 100a, as indicated by the difference in size between the first stand 98a and the second stand 98b of FIGS. 46 and 47.

In some embodiments, the stand 98 is substantially similar to the stand 12 of the chafing dish set 10. As previously discussed in this disclosure, the stand 12 may be configured to hold a chafing fuel canister 38. Similarly, as shown in FIGS. 46 and 47, the first stand 98a and the second stand 98b may be configured to hold at least one chafing fuel canister, wherein the first stand 98a defining the first stand form factor 100a is configured to hold one chafing fuel canister, and the second stand 98b defining the second stand form factor 100b is configured to hold two chafing fuel canisters. The system 78 may also include a chafing fuel cover and a chafing fuel base configured to substantially surround a bottom portion and a sidewall of the chafing fuel canister. The chafing fuel canister, chafing fuel cover, and chafing fuel base of the system 78 may be substantially the same as the chafing fuel canister 38, chafing fuel cover 34, and chafing fuel base 44 of the chafing dish set 10, as discussed previously in this disclosure, in particular with reference to FIGS. 10A and 10B.

Figure 48:
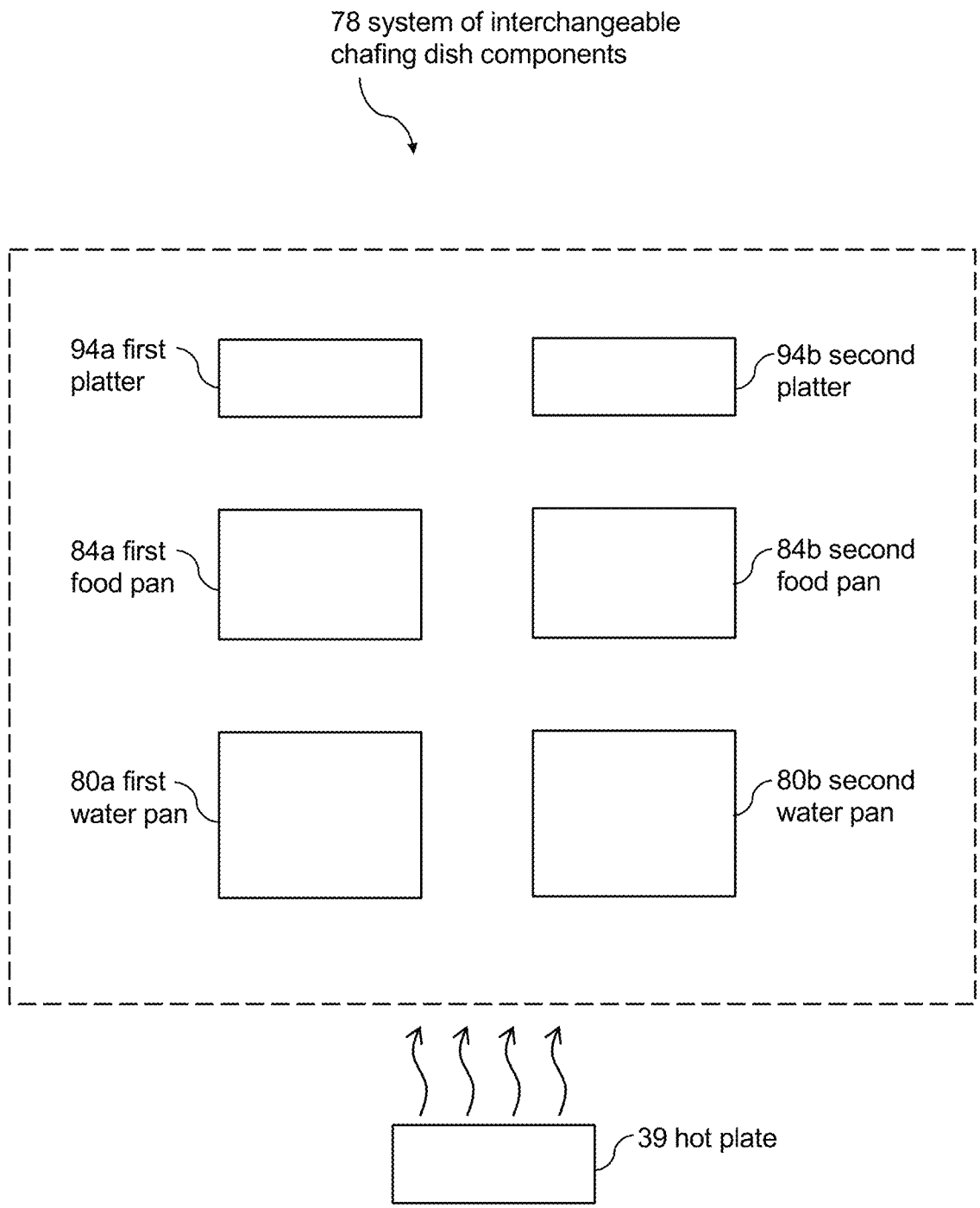
FIG. 48 illustrates a schematic of a system of interchangeable chafing dish components, according to some embodiments.

In some embodiments, the stand 98 is configured to hold a different type of heating mechanism configured to warm at least one of the first water pan 80a, the second water pan 80b, the first food pan 84a, the second food pan 84b, the first platter 94a, and the second platter 94b. The heating mechanism may comprise a hot plate, as shown in FIG. 48. In some embodiments, at least one of the first water pan 80a, the second water pan 80b, the first food pan 84a, the second food pan 84b, the first platter 94a, and the second platter 94b is configured to restably couple directly to the heating mechanism, rather than to a stand.

FIG. 48 shows a schematic of the system 78, including the first water pan 80a, the second water pan 80b, the first food pan 84a, the second food pan 84b, the first platter 94a, and the second platter 94b. FIG. 48 also includes a hot plate 39 and illustrates that, in some embodiments, the hot plate 39 is configured to warm at least one of the first water pan 80a, the second water pan 80b, the first food pan 84a, the second food pan 84b, the first platter 94a, and the second platter 94b.

Figure 49:
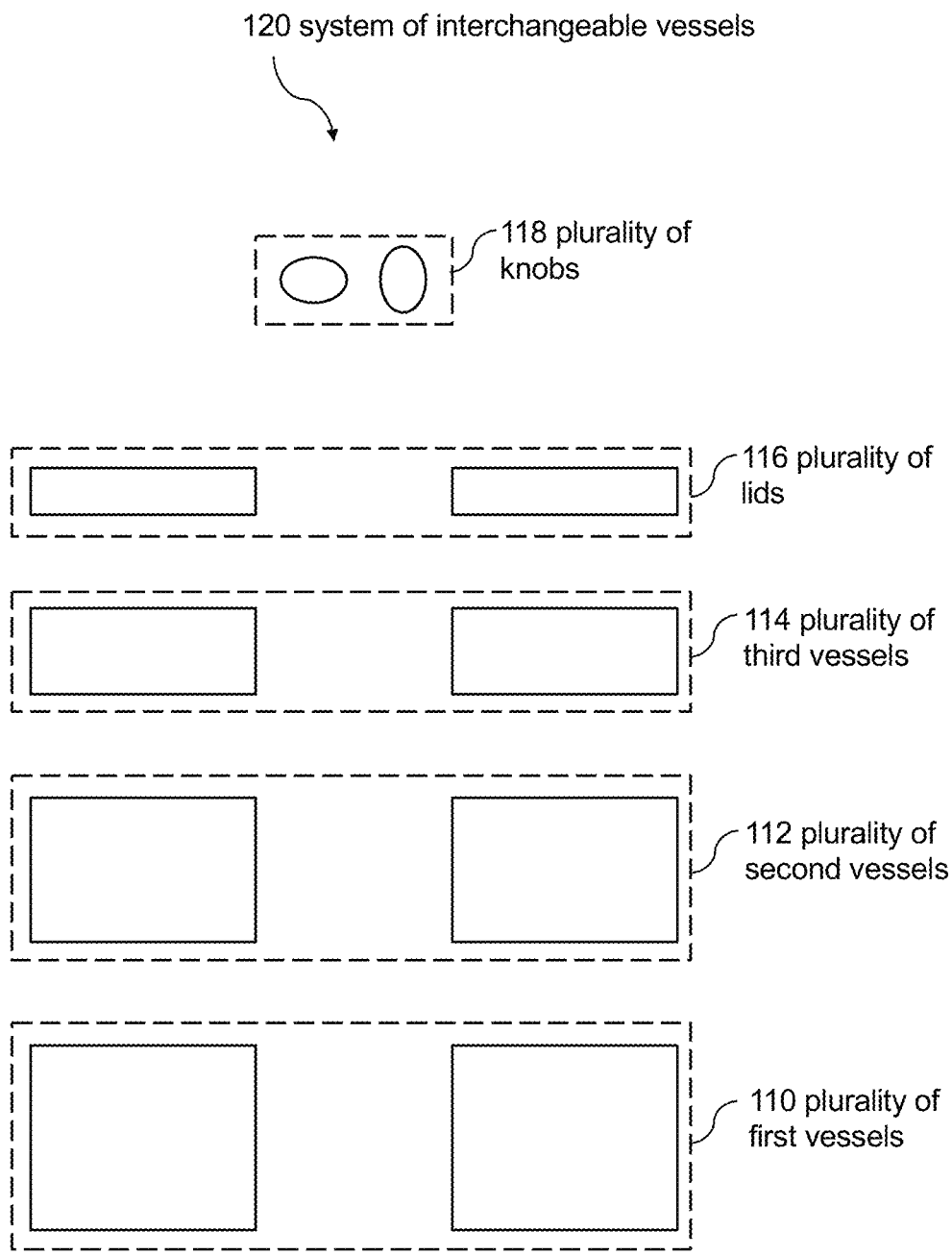
FIG. 49 illustrates a schematic of a system of interchangeable vessels, according to some embodiments.

FIG. 49 shows a schematic of a system of interchangeable vessels 120. In some embodiments, the system 120 includes a plurality of first vessels 110, a plurality of second vessels 112, a plurality of lids 116, and a plurality of knobs 118. Each second vessel of the plurality of second vessels 112 may be sized and configured to restably couple within each first vessel of the plurality of first vessels 110. In some embodiments, each lid of the plurality of lids 116 is sized and configured to restably couple to at least one of each first vessel of the plurality of first vessels 110 and each second vessel of the plurality of second vessels 112. Similar to the system 78, the system 120 may include a plurality of knobs 118 comprising a first knob and a second knob that is different from the first knob, wherein each of the first knob and the second knob is capable of being interchangeably coupled to each lid of the plurality of lids 116. The system 120 may further comprise a plurality of third vessels 114. In some embodiments, each third vessel of the plurality of third vessels 114 is sized and configured to restably couple within each second vessel of the plurality of second vessels 112. In addition, each lid of the plurality of lids 116 may be sized and configured to restably couple to each third vessel of the plurality of third vessels 114.

In some embodiments, each first vessel of the plurality of first vessels 110 defines a first depth, each second vessel of the plurality of second vessels 112 defines a second depth, and each third vessel of the plurality of third vessels 114 defines a third depth. The first depth may be greater than the second depth and the third depth, and the second depth may be greater than the third depth. Similar to the system 78, the system 120 may include a plurality of stands, wherein at least one of each first vessel of the plurality of first vessels 110, each second vessel of the plurality of second vessels 112, and each third vessel of the plurality of third vessels 114 is configured to restably couple to each stand of the plurality of stands.

Figure 50A:
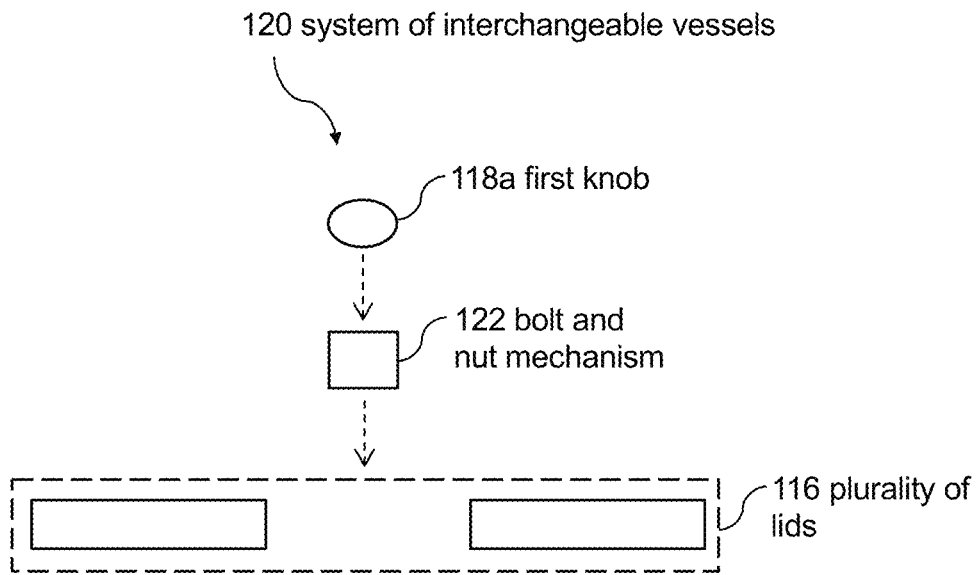
FIGS. 50A and 50B illustrate schematics of a system of interchangeable vessels, according to some embodiments.
Figure 50B:
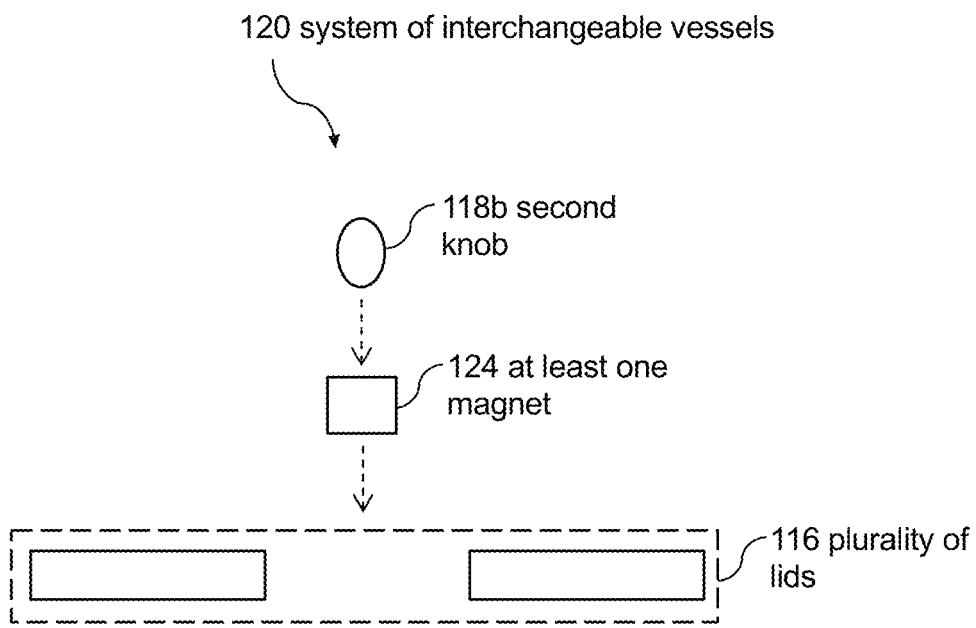

FIGS. 50A and 50B illustrate schematics of the system 120. In some embodiments, the first knob 118a is interchangeably coupled to each lid of the plurality of lids 116 via a first attachment mechanism, and the second knob 118b is interchangeably coupled to each lid of the plurality of lids 116 via a second attachment mechanism. The second attachment mechanism may be different than the first attachment mechanism. In some embodiments, the first attachment mechanism comprises a bolt and nut mechanism 122, as indicated in FIG. 50A. The second attachment mechanism may comprise at least one magnet 124, as indicated in FIG. 50B. It should be noted that any number of possible attachment mechanisms may be used to couple the first knob 118a and the second knob 118b to each lid of the plurality of lids 116.

It should be noted that the system of interchangeable vessels 120 may be configured for a wide variety of uses. In some embodiments, the system 120 is substantially similar to the system 78 and the vessels are configured to hold food, water, ice, etc. for food serving purposes. Alternatively, the vessels of the system 120 may be used for décor, storage, organization, gardening, or any of the other possible uses previously discussed in this disclosure. Individual vessels of the system 120 may also perform multiple functions over time. For example, the plurality of first vessels may be used to store spare linens and cutlery for a large portion of the year and brought out to be used as serve ware for special occasions, such as holidays. Any of the vessels within the system 120, as well as the plurality of lids 116, may include decorative (e.g., color or pattern) designs, as well as textured surface(s) (e.g., hammered). Similarly, any of the elements of the system 78 may include decorative and/or textured surfaces, similar to the chafing dish set 10.

INTERPRETATION

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are non-limiting. The section headings and subheadings do not represent or limit the full scope of the embodiments described in the sections to which the headings and subheadings pertain. For example, a section titled "Introduction" may include embodiments that do not pertain to the Introduction and embodiments described in other sections may apply to and be combined with embodiments described within the "Introduction" section.

The various features and processes described above may be used independently of one another, or may be combined in various ways. All possible combinations and sub-combinations are intended to fall within the scope of this disclosure. In addition, certain methods, events, states, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

The term "substantially" is used to mean "completely" or "nearly completely". For example, the disclosure includes, " . . . the chafing fuel cover comprising an aperture substantially aligned with a flame emitting portion of the chafing fuel canister." In this context, "substantially aligned with a flame emitting portion" means that the aperture may be completely or nearly completely aligned with the flame emitting portion. The aperture may be at least 75% aligned with the flame emitting portion, and fall within the understood meaning of "substantially" as used in this disclosure.

The term "about" is used to mean "approximately". For example, the disclosure includes, "The first depth 30a may be about 3.25 inches . . . " In this context, "about 3.25 inches" means "approximately" 3.25 inches. A depth between 3.0 and 3.5 inches may fall within an acceptable range of "about 3.25 inches".

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A system of interchangeable chafing dish components, comprising:
    a water pan comprising a holding portion configured to receive and hold at least one of a liquid and ice;
    a food pan capable of being restably coupled to the water pan, the food pan comprising an interior portion configured to receive and hold at least one of a food and a liquid;
    a lid capable of being interchangeably coupled to at least one of the water pan and the food pan; and
    a plurality of knobs comprising a first knob and a second knob that is different from the first knob, wherein each of the first knob and the second knob is capable of being interchangeably coupled to the lid.

2. The system of interchangeable chafing dish components of claim 1, further comprising a platter capable of being restably coupled to at least one of the water pan, the food pan, and the lid, the platter comprising an elevated food surface configured to sit within at least one of the holding portion of the water pan and the interior portion of the food pan.

3. The system of interchangeable chafing dish components of claim 2, wherein the platter is capable of restably coupling entirely within the interior portion of the food pan, and wherein the food pan is capable of restably coupling entirely within the holding portion of the water pan.

4. The system of interchangeable chafing dish components of claim 2, further comprising a stand, wherein at least one of the water pan, the food pan, and the platter is configured to restably couple to the stand.

5. The system of interchangeable chafing dish components of claim 4, wherein the water pan comprises a first water pan, the food pan comprises a first food pan, the lid comprises a first lid; and the platter comprises a first platter, the system further comprising:
    a second water pan comprising the holding portion configured to receive and hold at least one of the liquid and ice;
    a second food pan capable of being restably coupled to the second water pan, the second food pan comprising the interior portion configured to receive and hold at least one of a food and a liquid;
    a second platter capable of being restably coupled to at least one of the second water pan and the second food pan, the second platter comprising the elevated food surface configured to sit within at least one of the holding portion of the second water pan and the interior portion of the second food pan; and
    a second lid capable of being interchangeably coupled to at least one of the second water pan, the second food pan, and the second platter.

6. The system of interchangeable chafing dish components of claim 5, wherein the second food pan is capable of interchangeably coupling to at least one of the first water pan and the second water pan,
    wherein the second platter is capable of interchangeably coupling to at least one of the first water pan, the second water pan, the first food pan, and the second food pan,
    wherein the second lid is capable of interchangeably coupling to at least one of the first water pan, the second water pan, the first food pan, the second food pan, the first platter, and the second platter,
    wherein the first knob is capable of interchangeably coupling to at least one of the first lid and the second lid, and
    wherein the second knob is capable of interchangeably coupling to at least one of the first lid and the second lid.

7. The system of interchangeable chafing dish components of claim 5, wherein the stand comprises a first stand defining a first stand form factor, and wherein the first water pan defines a first water pan form factor, the first food pan defines a first food pan form factor, the first platter defines a first platter form factor, and the first lid defines a first lid form factor.

8. The system of interchangeable chafing dish components of claim 7, further comprising a second stand defining a second stand form factor, wherein the second water pan defines a second water pan form factor, the second food pan defines a second food pan form factor, the second platter defines a second platter form factor, and the second lid defines a second lid form factor, wherein at least one of the second water pan, the second food pan, and the second platter is configured to restably couple to the second stand.

9. The system of interchangeable chafing dish components of claim 5, further comprising a heating mechanism configured to warm at least one of the first water pan, the second water pan, the first food pan, the second food pan, the first platter, and the second platter.

10. The system of interchangeable chafing dish components of claim 9, wherein the heating mechanism comprises a hot plate.

11. The system of interchangeable chafing dish components of claim 9, wherein the heating mechanism comprises a chafing fuel canister.

12. The system of interchangeable chafing dish components of claim 11, further comprising a chafing fuel cover and a chafing fuel base configured to substantially surround a bottom portion and a sidewall of the chafing fuel canister.

13. A system of interchangeable vessels, comprising:
a plurality of first vessels;
a plurality of second vessels, each second vessel of the plurality of second vessels sized and configured to restably couple within each first vessel of the plurality of first vessels;
a plurality of lids, each lid of the plurality of lids sized and configured to restably couple to at least one of each first vessel of the plurality of first vessels and each second vessel of the plurality of second vessels; and
a plurality of knobs comprising a first knob and a second knob that is different from the first knob, wherein each of the first knob and the second knob is capable of being interchangeably coupled to each lid of the plurality of lids.

14. The system of interchangeable vessels of claim 13, further comprising a plurality of third vessels, each third vessel of the plurality of third vessels sized and configured to restably couple within each second vessel of the plurality of second vessels, wherein each lid of the plurality of lids is sized and configured to restably couple to each third vessel of the plurality of third vessels.

15. The system of interchangeable vessels of claim 14, wherein each first vessel of the plurality of first vessels defines a first depth, each second vessel of the plurality of second vessels defines a second depth, and each third vessel of the plurality of third vessels defines a third depth.

16. The system of interchangeable vessels of claim 15, wherein the first depth is greater than the second depth and the third depth, and wherein the second depth is greater than the third depth.

17. The system of interchangeable vessels of claim 14, further comprising a plurality of stands, wherein at least one of each first vessel of the plurality of first vessels, each second vessel of the plurality of second vessels, and each third vessel of the plurality of third vessels is configured to restably couple to each stand of the plurality of stands.

18. The system of interchangeable vessels of claim 13, wherein the first knob is interchangeably coupled to each lid of the plurality of lids via a first attachment mechanism, and wherein the second knob is interchangeably coupled to each lid of the plurality of lids via a second attachment mechanism that is different from the first attachment mechanism.

19. The system of interchangeable vessels of claim 18, wherein the first attachment mechanism comprises a bolt and nut mechanism.

20. The system of interchangeable vessels of claim 18, wherein the second attachment mechanism comprises at least one magnet.

* * * * *